(12) United States Patent
Obuchi et al.

(10) Patent No.: US 9,008,674 B2
(45) Date of Patent: Apr. 14, 2015

(54) WIRELESS COMMUNICATION SYSTEM, TRANSMITTER, RECEIVING APPARATUS, AND NOTIFICATION INFORMATION TRANSMISSION-RECEPTION METHOD

(75) Inventors: Kazuhisa Obuchi, Yokohama (JP); Yoshiharu Tajima, Yokohama (JP); Katsumasa Sugiyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 370 days.

(21) Appl. No.: 13/596,883

(22) Filed: Aug. 28, 2012

(65) Prior Publication Data

US 2012/0322467 A1    Dec. 20, 2012

Related U.S. Application Data

(63) Continuation of application No. PCT/JP2010/054259, filed on Mar. 12, 2010.

(51) Int. Cl.
*H04W 72/00*    (2009.01)
*H04W 68/00*    (2009.01)
*H04L 12/26*    (2006.01)
*H04W 52/02*    (2009.01)
*H04W 48/08*    (2009.01)

(52) U.S. Cl.
CPC .......... *H04W 52/0216* (2013.01); *H04W 48/08* (2013.01); *Y02B 60/50* (2013.01)

(58) Field of Classification Search
USPC ........... 455/458, 434, 435.1–435.3, 436–444, 455/450–452.1, 456.1–457; 370/331, 252
See application file for complete search history.

(56) References Cited

U.S. PATENT DOCUMENTS

| | | | |
|---|---|---|---|
| 6,628,946 B1 * | 9/2003 | Wiberg et al. | 455/434 |
| 2003/0092375 A1 | 5/2003 | Iwanaga et al. | |
| 2008/0107057 A1 | 5/2008 | Kannan et al. | |
| 2008/0184068 A1 * | 7/2008 | Mogi et al. | 714/15 |

FOREIGN PATENT DOCUMENTS

| | | |
|---|---|---|
| JP | 2003-153324 | 5/2003 |
| JP | 2005-229217 | 8/2005 |

OTHER PUBLICATIONS

International Search Report issued for corresponding International Patent Application No. PCT/JP2010/054259, mailed on Jun. 8, 2010. English translation attached.
3GPP TS 36.331 V9.1.0; 3rd Generation Partnership Project; Technical Specification Group Radio Access Network; Evolved Universal Terrestrial Radio Access (E-UTRA) Radio Resource Control (RRC); Protocol specification (Release 9); dated Dec. 2009.
Extended European search report and the European search opinion issued for corresponding European Patent Application No. 10847463.6 dated Aug. 2, 2013.

* cited by examiner

*Primary Examiner* — Michael Mapa
(74) *Attorney, Agent, or Firm* — Myers Wolin, LLC

(57) ABSTRACT

A receiving apparatus includes a storing unit that stores therein notification information transmitted from a base station, a receiving unit that receives, from among the notification information transmitted by the base station, revision history of change information related to the notification information, and an updating unit that updates the notification information stored in the storing unit on the basis of the change information contained in the revision history received by the receiving unit.

11 Claims, 19 Drawing Sheets

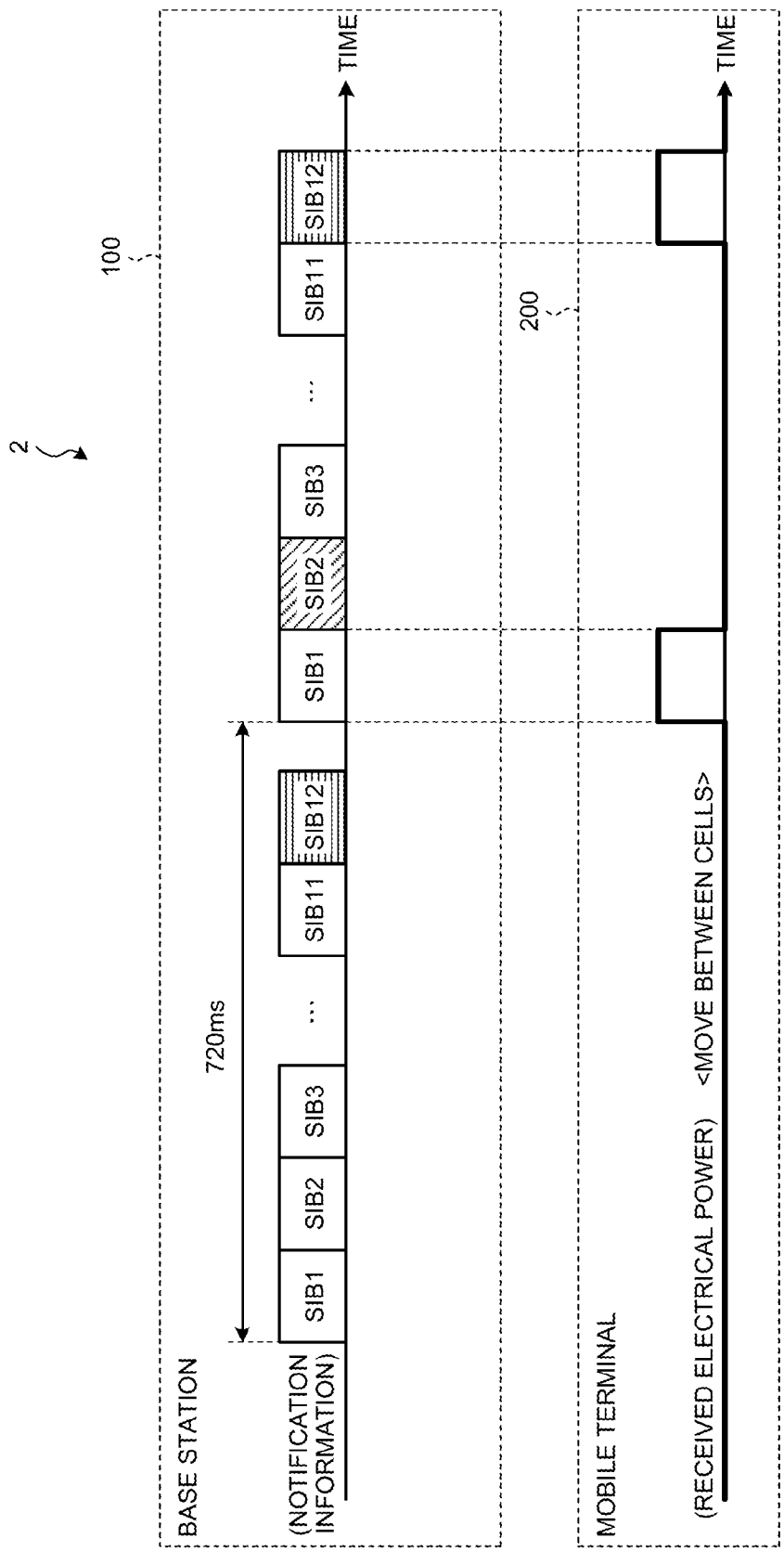

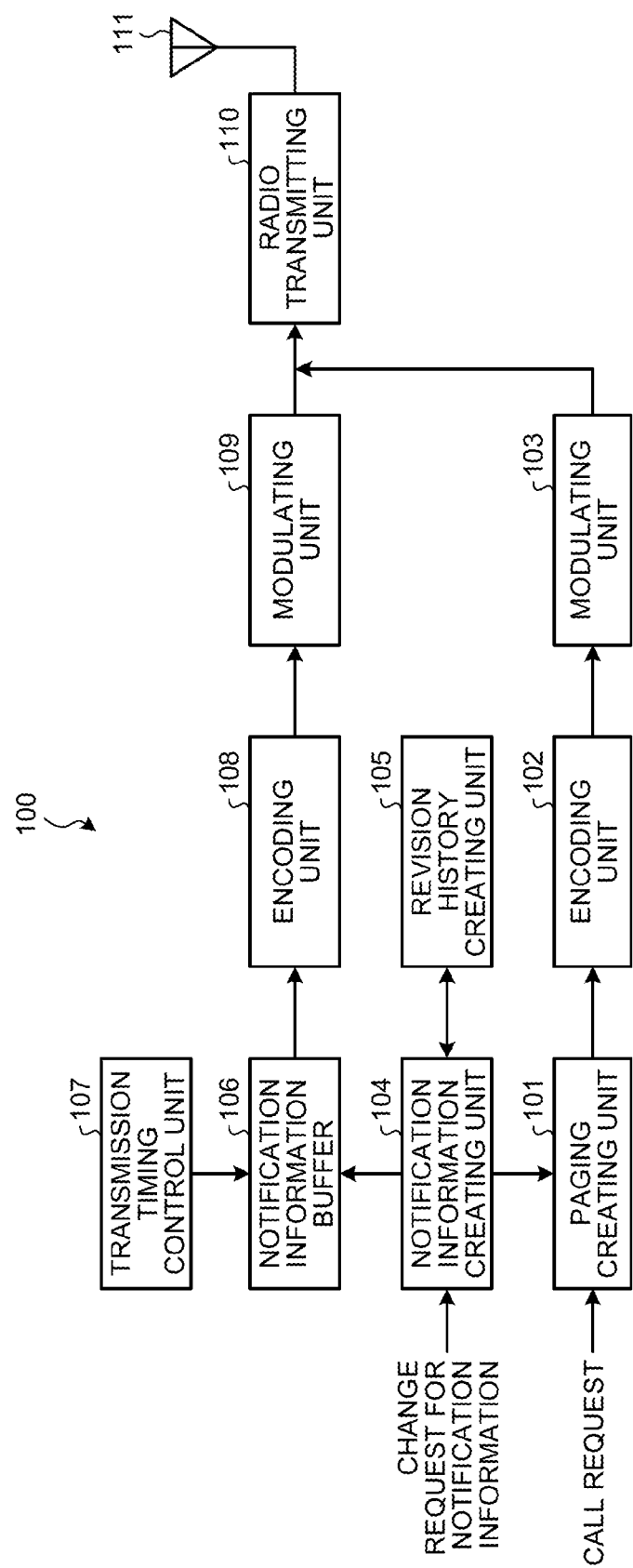

FIG.5

R11: HISTORY 1: RECEIVED ELECTRICAL POWER CORRESPONDING TO CONDITION FOR MOVING INTO CELL ID OF "XXX" IS CHANGED TO "3dB"

UPDATE

R12: HISTORY 1: CELL ID OF "YYY" IS DELETED FROM PERIPHERAL CELL LIST
CELL ID OF "ZZZ" IS DELETED FROM PERIPHERAL CELL LIST

HISTORY 2: RECEIVED ELECTRICAL POWER CORRESPONDING TO CONDITION FOR MOVING INTO CELL ID OF "XXX" IS CHANGED TO "3dB"

UPDATE

R13: HISTORY 1: PAGING PERIOD IS CHANGED TO "8"

HISTORY 2: CELL ID OF "YYY" IS DELETED FROM PERIPHERAL CELL LIST
CELL ID OF "ZZZ" IS DELETED FROM PERIPHERAL CELL LIST

HISTORY 3: RECEIVED ELECTRICAL POWER CORRESPONDING TO CONDITION FOR MOVING INTO CELL ID OF "XXX" IS CHANGED TO "3dB"

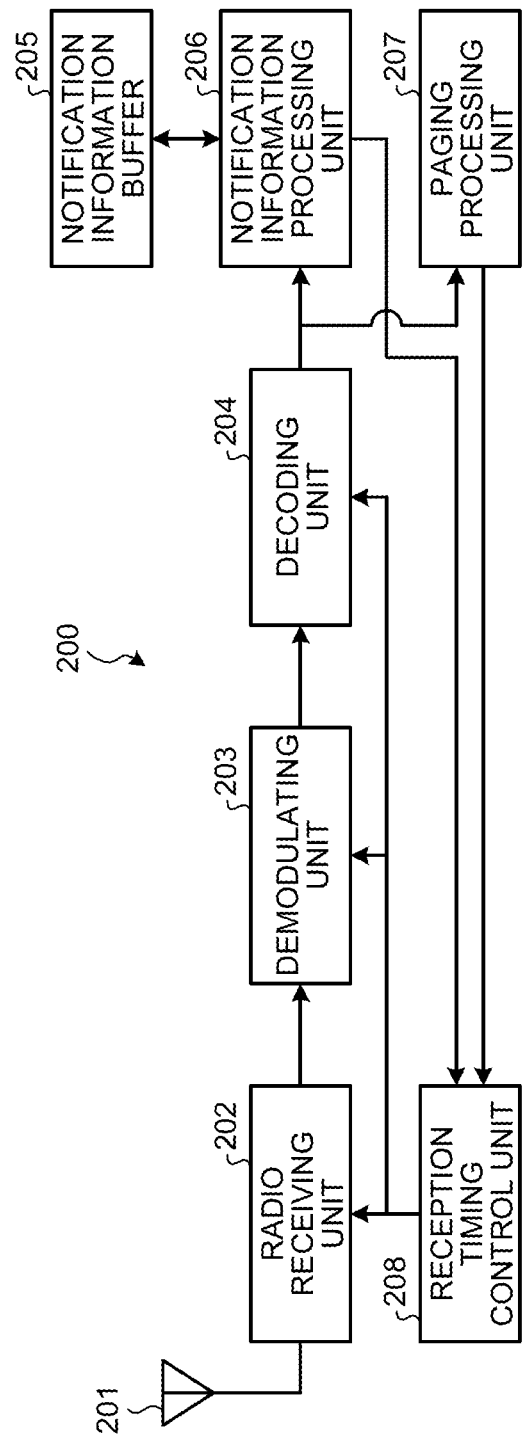

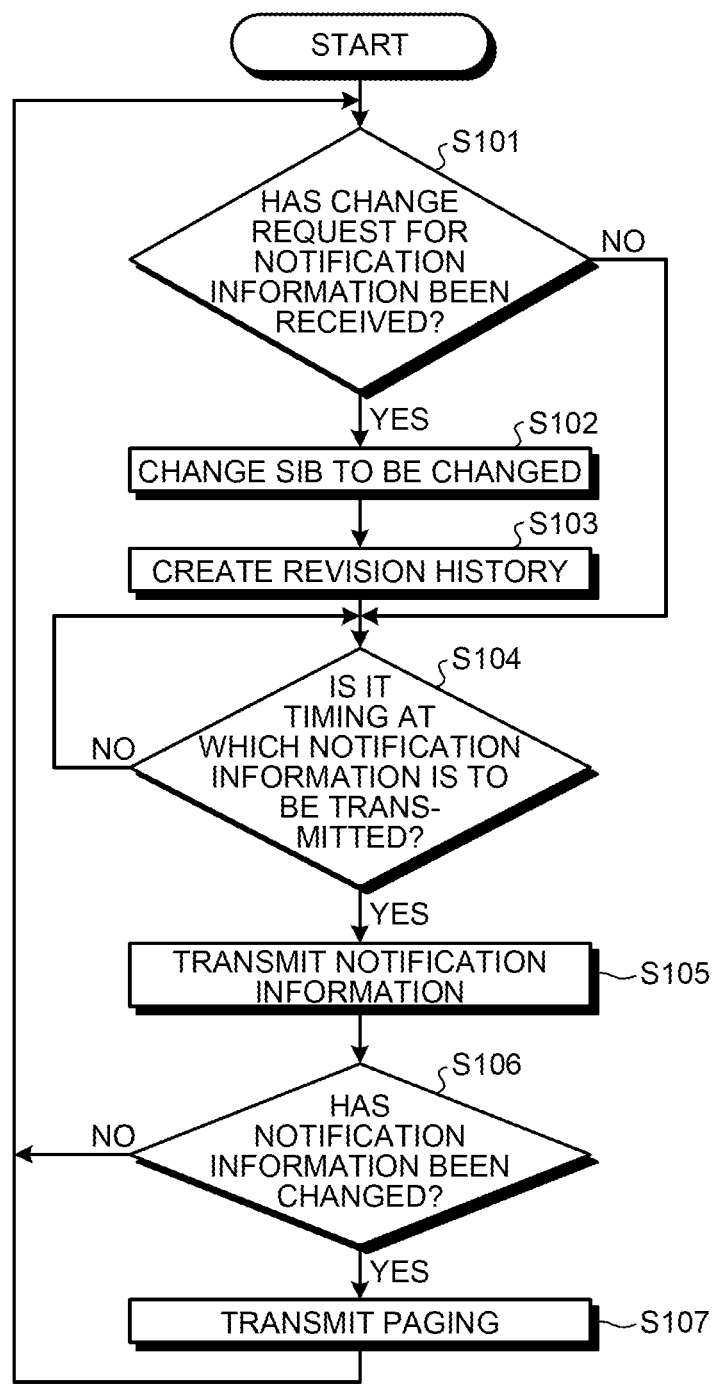

FIG.11

R31
AT13:25:10: RECEIVED ELECTRICAL POWER CORRESPONDING TO CONDITION FOR MOVING INTO CELL ID OF "XXX" IS CHANGED TO "3dB"

UPDATE

R32
AT 13:40:25: CELL ID OF "YYY" IS DELETED FROM PERIPHERAL CELL LIST
CELL ID OF "ZZZ" IS DELETED FROM PERIPHERAL CELL LIST

AT13:25:10: RECEIVED ELECTRICAL POWER CORRESPONDING TO CONDITION FOR MOVING INTO CELL ID OF "XXX" IS CHANGED TO "3dB"

UPDATE

R33
AT 13:52:05: PAGING PERIOD IS CHANGED TO "8"

AT 13:40:25: CELL ID OF "YYY" IS DELETED FROM PERIPHERAL CELL LIST
CELL ID OF "ZZZ" IS DELETED FROM PERIPHERAL CELL LIST

AT13:25:10: RECEIVED ELECTRICAL POWER CORRESPONDING TO CONDITION FOR MOVING INTO CELL ID OF "XXX" IS CHANGED TO "3dB"

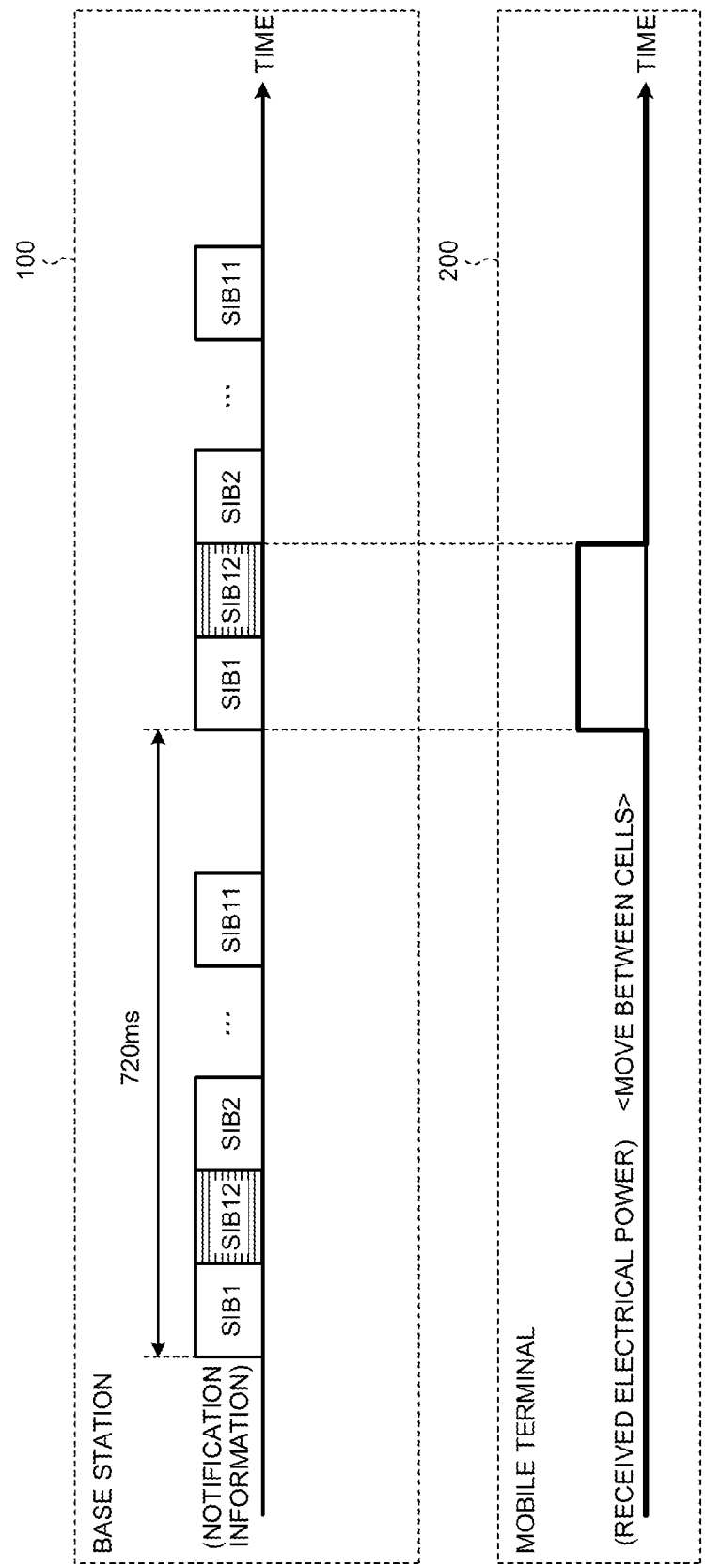

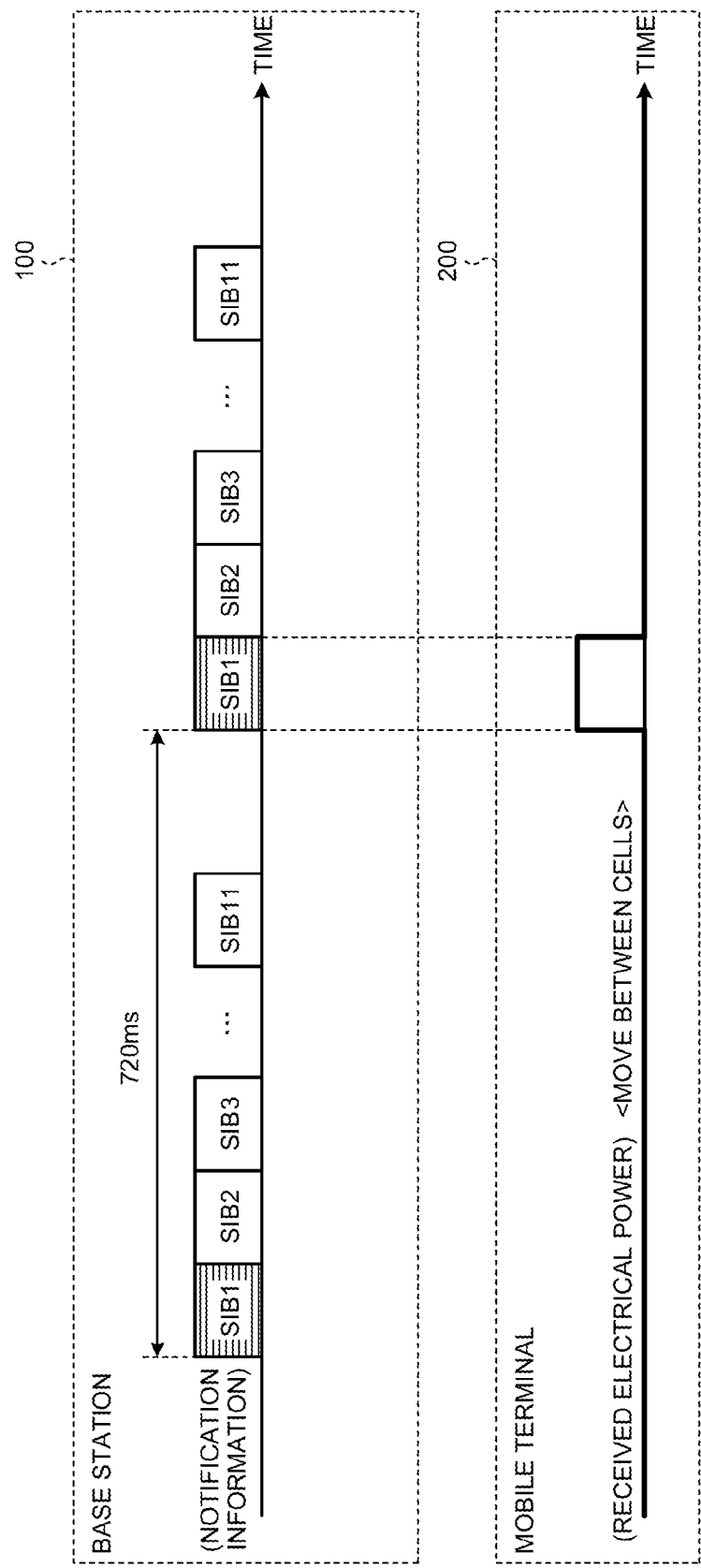

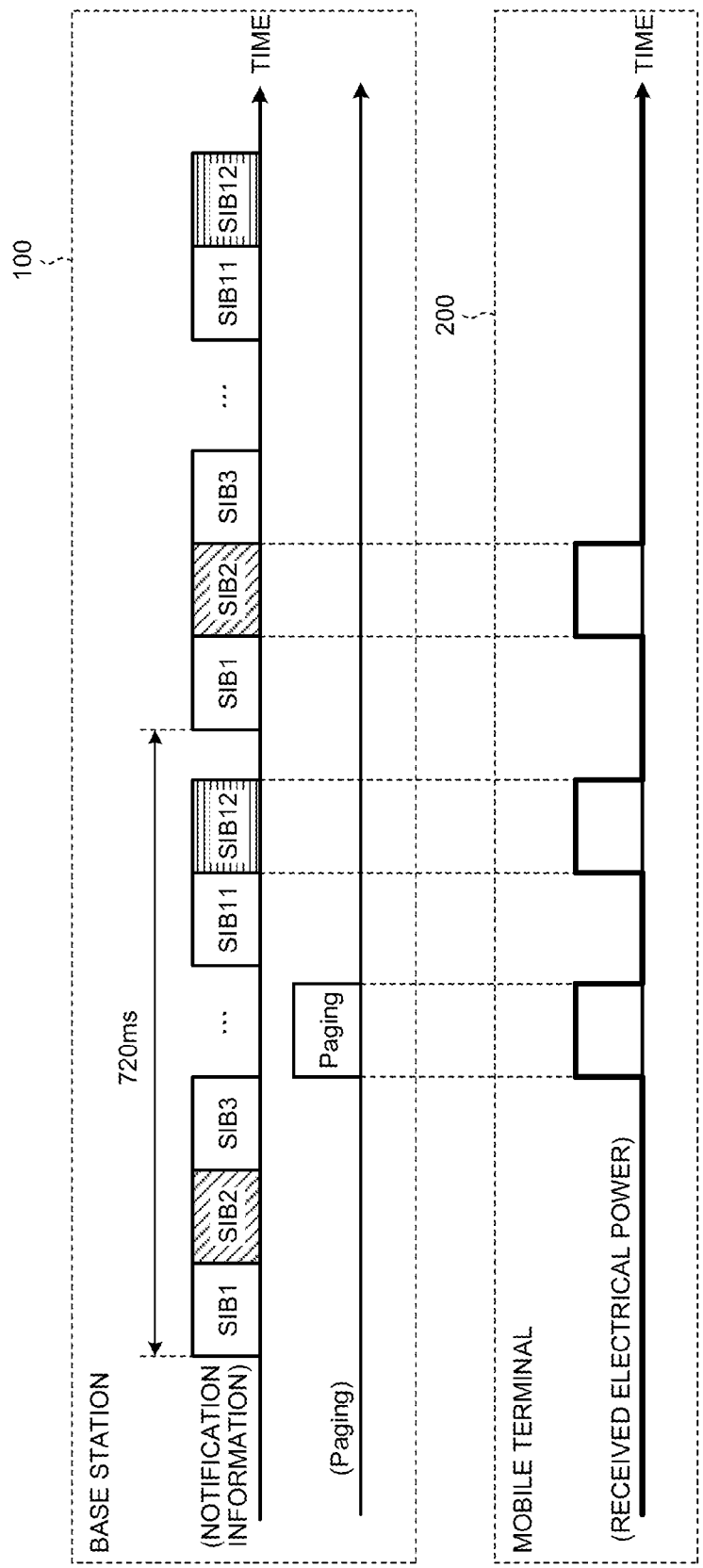

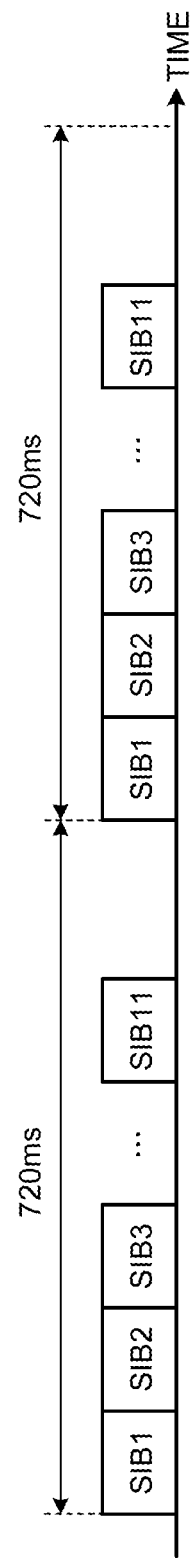

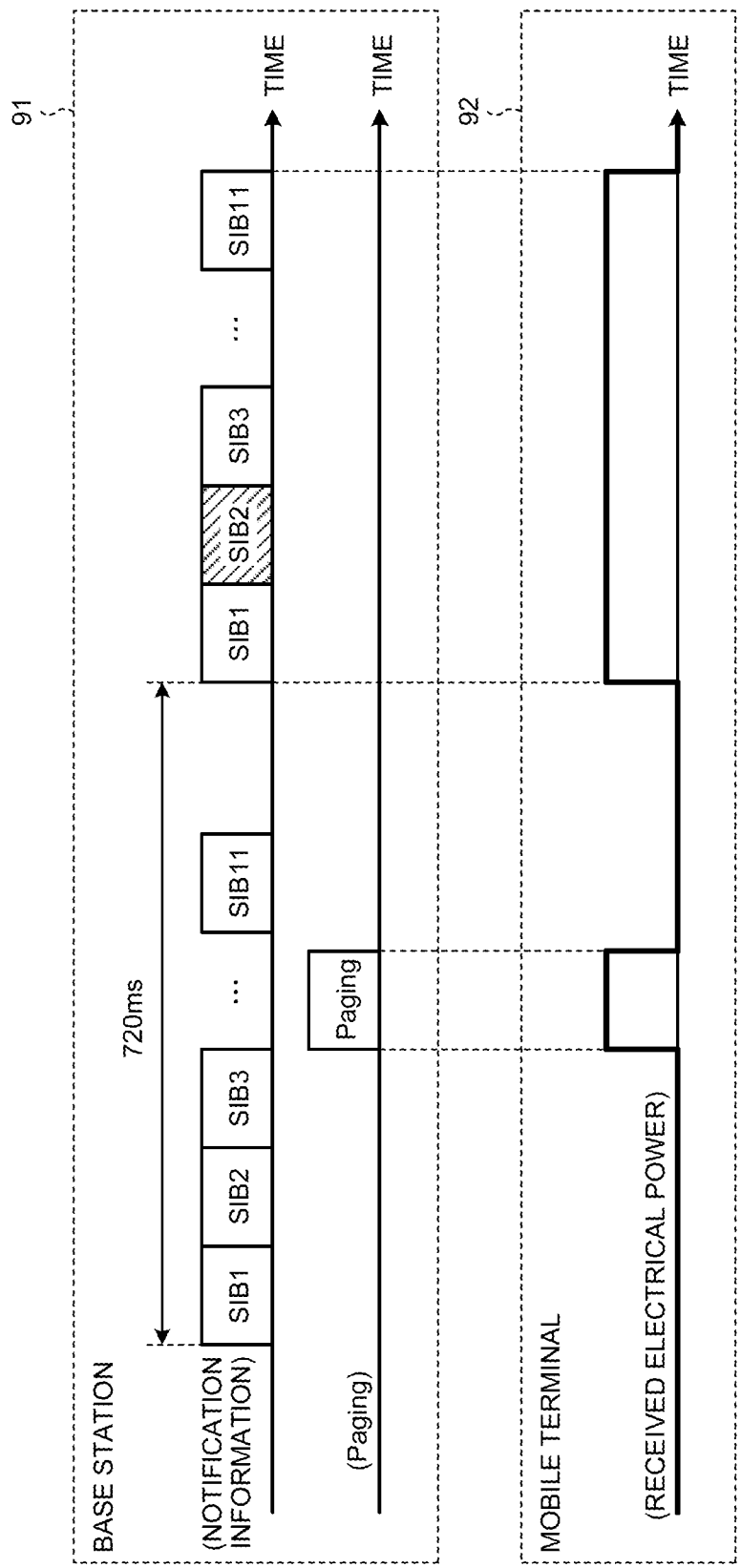

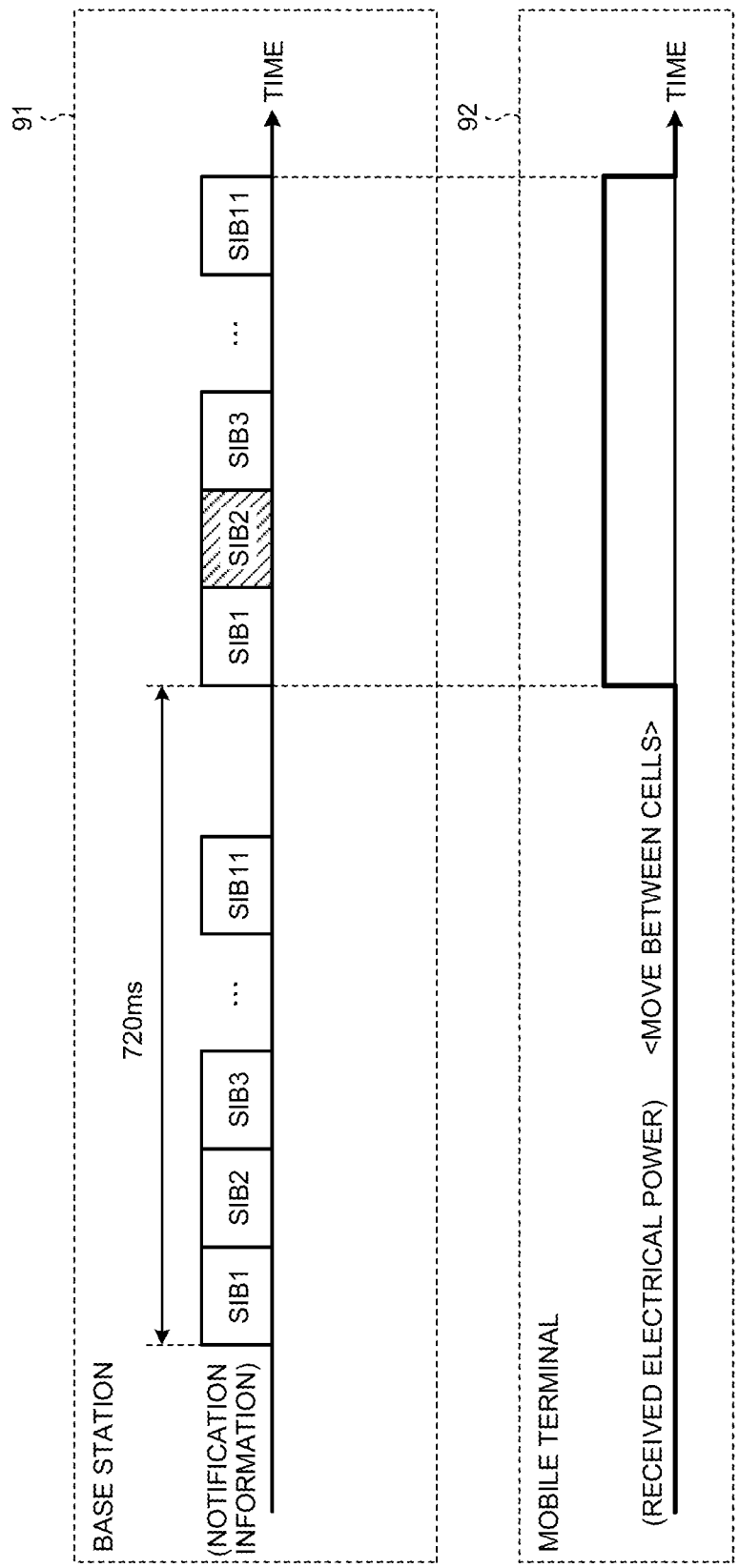

WIRELESS COMMUNICATION SYSTEM, TRANSMITTER, RECEIVING APPARATUS, AND NOTIFICATION INFORMATION TRANSMISSION-RECEPTION METHOD

CROSS-REFERENCE TO RELATED APPLICATION

This application is a continuation application of International Application PCT/JP2010/054259, filed on Mar. 12, 2010, and designating the U.S., the entire contents of which are incorporated herein by reference.

FIELD

The embodiments discussed herein are related to a wireless communication system, a transmitter, a receiving apparatus, and a notification information transmission-reception method.

BACKGROUND

In a conventional wireless communication system using a cellular systems, base stations transmit notification information at regular intervals within their own cells. The notification information mentioned here is various kinds of information that is used when a mobile terminal located in the cell performs wireless communication. For example, the notification information includes information on, for example, a cell ID for identifying a cell, paging period, and peripheral cells.

FIG. 17 is a schematic diagram illustrating an example of notification information transmitted by a conventional base station. As illustrated in FIG. 17, the notification information includes multiple system information blocks (SIB). In the example illustrated in FIG. 17, the notification information includes 11 SIBs: SIB1 to SIB11. Each of the SIB1 to SIB11 contain different information. For example, the SIB1 contains a "Value tag" that is incremented by a base station every time the notification information is updated. Furthermore, for example, the SIB2 contains information on a paging cycle. Furthermore, for example, the SIB3 contains a condition for moving to another cell. The remaining SIB4 to SIB11 also include various kinds of information related to the notification information.

In the example illustrated in FIG. 17, the base station transmits the notification information containing SIB1 to SIB11 at 720-ms intervals. When the power supply of the mobile terminal is turned on, when the mobile terminal moves between cells, when the notification information is changed, or when a predetermined time elapses, the mobile terminal receives notification information and stores therein the received notification information. Accordingly, wireless communication can be performed in the mobile terminal even when its power supply is being turned on or moving between cells.

Non Patent Literature 1: 3GPP TS 36.331 V9.1.0 (2009-12), "Evolved Universal Terrestrial Radio Access (E-UTRA); Radio Resource Control (RRC); Protocol specification (Release 9)"

However, with the conventional technology, there is a problem in that electrical power consumed when a receiving process is performed on notification information increases. Such a problem will be specifically described using the example illustrated in FIGS. 18 and 19.

FIGS. 18 and 19 are schematic diagrams each illustrating an example of a transmission/receiving process performed by a conventional base station and a conventional mobile terminal on notification information. In the example illustrated in FIG. 18, it is assumed that a mobile terminal 92 is located in a cell formed by a base station 91. Furthermore, it is assumed that the power supply of the mobile terminal 92 is turned on and it is assumed that the mobile terminal 92 has already received the notification information from the base station 91 and is in a standby state.

As illustrated in FIG. 18, the base station 91 regularly transmits notification information containing the SIB1 to the SIB11. In this example, it is assumed that the information contained in the SIB2 is changed. In such a case, the base station 91 transmits paging in order to notify the mobile terminal 92 that the notification information has been changed. If the mobile terminal 92 receives the paging from the base station 91, the mobile terminal 92 confirms that the notification information has been changed and receives the notification information transmitted from the base station 91. At this time, the mobile terminal 92 receives all of the SIB1 to the SIB11 contained in the notification information and updates all the pieces of notification information retained in the mobile terminal 92.

In this way, if the mobile terminal 92 is notified that the notification information has been changed, the mobile terminal 92 receives all the pieces of notification information transmitted from the base station 91. Accordingly, as illustrated in the lower portion of FIG. 18, the mobile terminal 92 consumes received electrical power when it receives the SIB1 to the SIB11. Therefore, in the mobile terminal 92, electrical power consumed when the receiving process is performed on the notification information increases.

Furthermore, in the example illustrated in FIG. 19, it is assumed that, after the mobile terminal 92 moves from a cell formed by the base station 91 to another cell, the mobile terminal 92 again moves into the cell formed by the base station 91. Furthermore, it is assumed that a cell ID and a "Value tag" are contained in the SIB1.

The mobile terminal 92 retains received notification information as history information even after the mobile terminal 92 moves from one cell to another cell. When the mobile terminal 92 again moves into the cell formed by the base station 91, the mobile terminal 92 receives, from among notification information transmitted from the base station 91, the SIB1 that contains a cell ID and a "Value tag". Then, the mobile terminal 92 determines whether the cell ID contained in the SIB1 matches the cell ID contained in the notification information retained in the mobile terminal 92. If both cell IDs match, the mobile terminal 92 compares the "Value tag" contained in the SIB1 received from the base station 91 with the "Value tag" of the notification information retained in the mobile terminal 92.

If the cell IDs differ or if the "Value tags" differ, the mobile terminal 92 receives all the pieces of notification information transmitted from the base station 91. Then, the mobile terminal 92 updates all the pieces of notification information retained in the mobile terminal 92 to the notification information received from the base station 91.

As described above, when the mobile terminal 92 moves between cells, the mobile terminal 92 may sometimes receive all the pieces of notification information transmitted from the base station 91. Accordingly, as illustrated in the lower portion of FIG. 19, the mobile terminal 92 consumes received electrical power when it receives the SIB1 to the SIB11. Accordingly, in the mobile terminal 92, the electrical power consumed when the receiving process is performed on the notification information increases. The mobile terminal 92 also receives the SIB1 when the power supply of the mobile terminal 92 is turned on or when the mobile terminal 92 moves into a service range from outside a service range. At this time, if cell IDs or "Value tags" differ, the mobile terminal 92 receives all the pieces of notification information. Accordingly, when the power supply of the mobile terminal 92 is turned on or when the mobile terminal 92 moves into a service range from outside a service range, the electrical power consumed when the receiving process is performed on the notification information also increases.

SUMMARY

According to an aspect of the embodiments, a wireless communication system includes a transmitter and a receiving apparatus. The transmitter includes a revision history creating unit that creates revision history containing change information related to notification information when the notification information has been changed, and a transmitting unit that transmits notification information containing the revision history created by the revision history creating unit. The receiving apparatus includes a storing unit that stores therein notification information, a receiving unit that receives the revision history from among the notification information transmitted by the transmitting unit, and an updating unit that updates the notification information stored in the storing unit on the basis of change information contained in the revision history received by the receiving unit.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 is a schematic diagram illustrating a transmission/receiving process performed on notification information;

FIG. 4 is a block diagram illustrating an configuration example of a base station according to a second embodiment;

FIG. 5 is a schematic diagram illustrating an example of the revision history of notification information created by a revision history creating unit illustrated in FIG. 4;

FIG. 6 is a block diagram illustrating an example configuration of a mobile terminal according to the second embodiment;

FIG. 7 is a flowchart illustrating the flow of a notification information transmission process performed by the base station according to the second embodiment;

FIG. 11 is a schematic diagram illustrating an example of a revision history in which the date and time at which notification information is changed is associated with the change information;

FIG. 12 is a schematic diagram illustrating an example of a transmission/receiving process performed on notification information;

FIG. 13 is a schematic diagram illustrating an example of a transmission/receiving process performed on notification information;

FIG. 14 is a schematic diagram illustrating an example of a transmission/receiving process performed on notification information;

FIG. 17 is a schematic diagram illustrating an example of notification information transmitted by a conventional base station;

FIG. 18 is a schematic diagram illustrating an example of a transmission/receiving process performed on notification information by a conventional base station and a conventional mobile terminal; and FIG. 19 is a schematic diagram illustrating an example of a transmission/receiving process performed on notification information by a conventional base station and a conventional mobile terminal.

DESCRIPTION OF EMBODIMENTS

Preferred embodiments of a wireless communication system, a transmitter, a receiving apparatus, and a notification information transmission-reception method disclosed in the present application will be described in detail below with reference to the accompanying drawings. The wireless communication system, the transmitter, the receiving apparatus, and the notification information transmission-reception method are not limited to these embodiments disclosed in the present application.

First Embodiment

Figure 1:
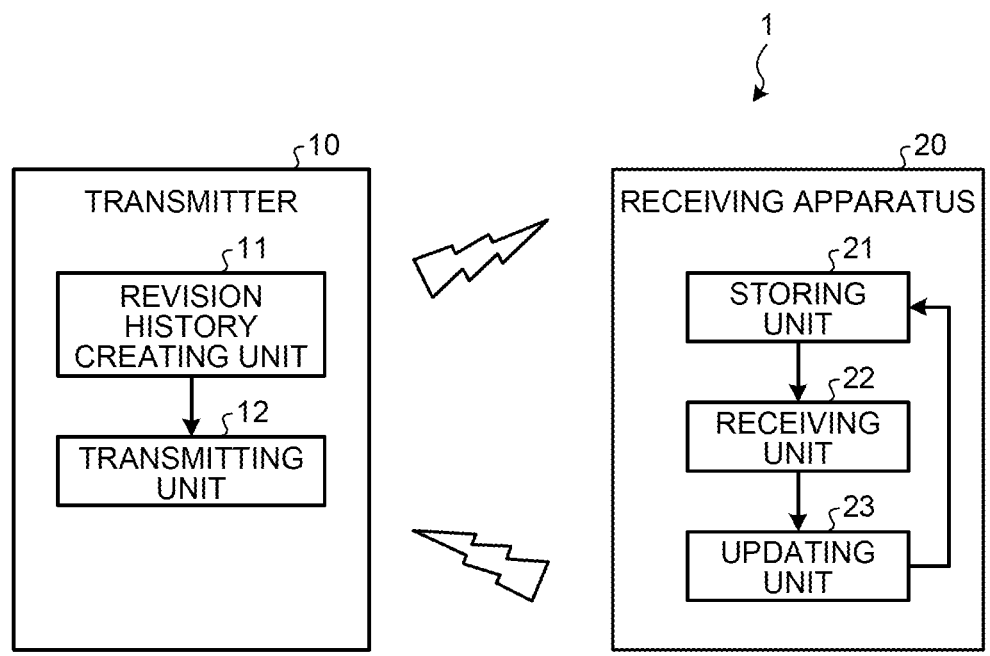
FIG. 1 is a block diagram illustrating an example configuration of a wireless communication system according to a first embodiment.

First, a wireless communication system according to a first embodiment will be described with reference to FIG. 1. FIG. 1 is a block diagram illustrating an example configuration of a wireless communication system according to a first embodiment. As illustrated in FIG. 1, a wireless communication system 1 according to the first embodiment includes a transmitter 10 and a receiving apparatus 20. The transmitter 10 and the receiving apparatus 20 perform wireless communication each other.

The transmitter 10 is, for example, a base station and includes, as illustrated in FIG. 1, a revision history creating unit 11 and a transmitting unit 12. If notification information has been changed, the revision history creating unit 11 creates revision history containing change information related to the notification information. For example, if the revision history creating unit 11 receives a request to change notification information from, for example, a higher-level device, the revision history creating unit 11 creates revision history of the notification information.

The "change information related to the notification information" mentioned here indicates, for example, the difference between notification information that has not been changed and notification information that has been changed. For example, it is assumed that a "paging period of "10"" is contained in notification information that has not been changed and assumed that a "paging period of "8"" is contained in notification information that has been changed. In such a case, the "change information related to the notification information" indicates the "paging period of "8"". Then, the change information related to such notification information is set as history in the "revision history of the notification information".

The transmitting unit 12 transmits notification information containing the revision history created by the revision history creating unit 11. For example, in addition to the regularly transmitted notification information, the transmitting unit 12 transmits, as notification information, revision history created by the revision history creating unit 11.

The receiving apparatus 20 is, for example, a mobile terminal and includes, as illustrated in FIG. 1, a storing unit 21, a receiving unit 22, and an updating unit 23. The storing unit 21 stores therein notification information. The receiving unit 22 receives revision history from among notification information transmitted by the transmitting unit 12 in the transmitter 10. On the basis of change information contained in the revision history of the notification information received by the receiving unit 22, the updating unit 23 updates the notification information stored in the storing unit 21.

As described above, in the wireless communication system 1 according to the first embodiment, the transmitter 10 transmits notification information containing revision history. Instead of receiving all the pieces of notification information, the receiving apparatus 20 receives the revision history of the notification information and updates, on the basis of the received revision history, notification information that is retained in the receiving apparatus 20.

Accordingly, with the receiving apparatus 20 according to the first embodiment, even when notification information has been changed or even when the receiving apparatus 20 has moved between cells, the receiving apparatus 20 receives only revision history instead of receiving all the pieces of notification information. Consequently, the receiving apparatus 20 can reduce electrical power consumed when a receiving process is performed on the notification information. Furthermore, because the receiving apparatus 20 updates only the changed notification information, the receiving apparatus 20 can reduce electrical power consumed when an update process is performed on the notification information.

Second Embodiment

In the following, in a second embodiment, a description will be given of a case in which the transmitter 10 described in the first embodiment is used for a base station and the receiving apparatus 20 is used for a mobile terminal.

Figure 2:
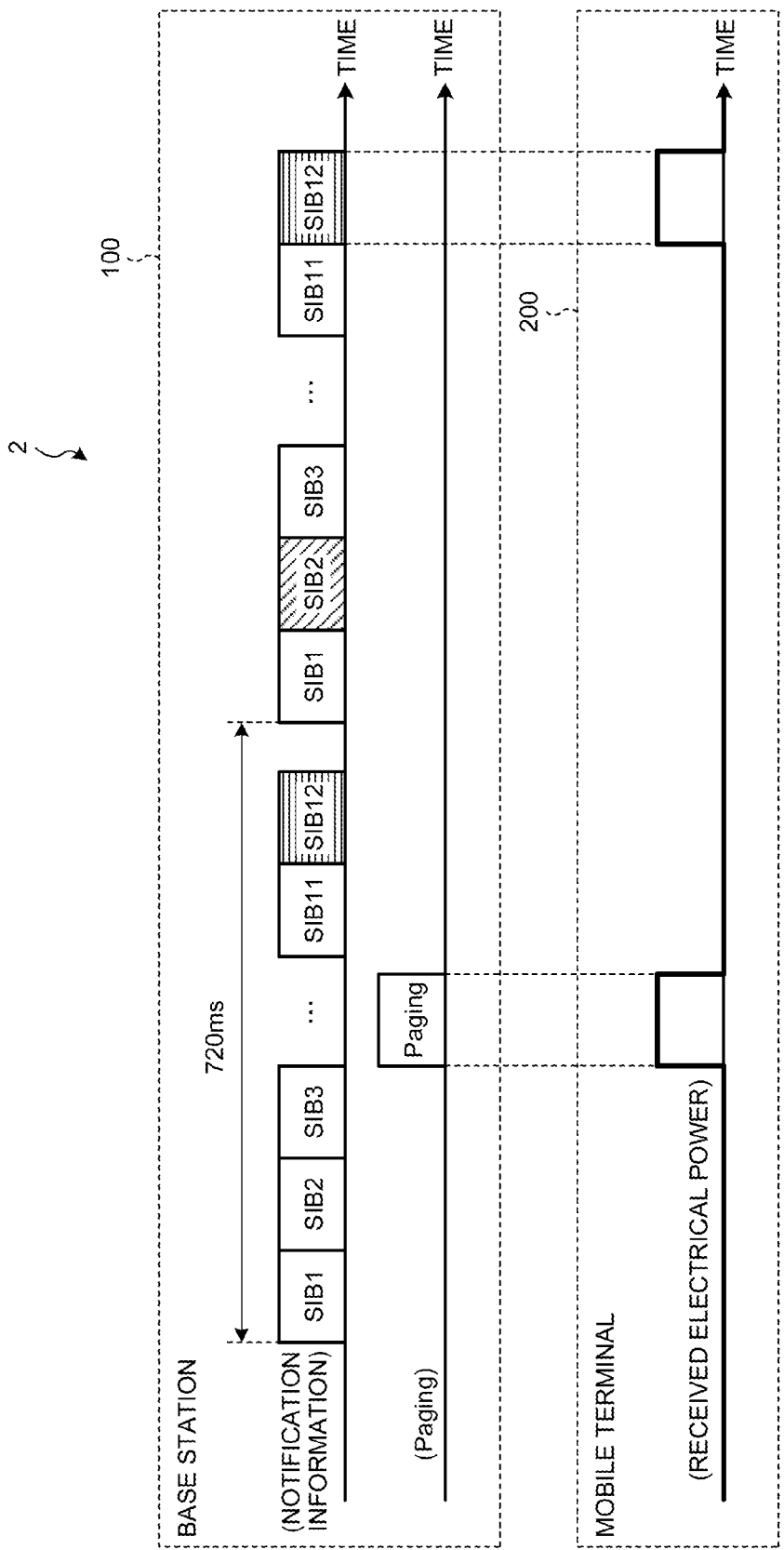
FIG. 2 is a schematic diagram illustrating a transmission/receiving process performed on notification information.

Notification Information Transmission Process Performed by the Wireless Communication System According to the Second Embodiment First, a notification information transmission process in a wireless communication system according to the second embodiment will be described with reference to FIGS. 2 and 3. FIGS. 2 and 3 are schematic diagrams each illustrating a transmission/receiving process performed on notification information. As illustrated in FIG. 2, a wireless communication system 2 according to the second embodiment includes a base station 100 and a mobile terminal 200.

Similarly to the example illustrated in FIG. 18, the base station 100 according to the second embodiment regularly transmits the SIB1 to the SIB11 as notification information. Furthermore, the base station 100 creates the SIB12 that contains revision history of change information that is the contents of the changed notification information from among the SIB1 to the SIB11 and also regularly transmits the created SIB12. In other words, the base station 100 transmits, as notification information, the SIB1 to the SIB11 and the SIB12 that indicates revision history of the notification information.

At this stage, it is assumed that the information contained in the SIB2 has been changed. In such a case, the base station 100 creates the SIB12 that contains change information on the SIB2. For example, it is assumed that the SIB2 contains information on a paging period and assumed that the paging period has been changed from "10" to "8". In such a case, the base station 100 updates the contents of the SIB2 to the "paging period of "8"" and creates the SIB12 containing the "paging period of "8"". Then, the base station 100 transmits notification information containing the changed SIB2 and the SIB12. Furthermore, the base station 100 transmits paging to notify the mobile terminal 200 that the notification information has been changed.

If the mobile terminal 200 according to the second embodiment receives the paging from the base station 100, the mobile terminal 200 determines whether the paging indicates a call. If the paging does not indicate a call, the mobile terminal 200 determines that notification information has been changed. Then, as in the example illustrated in FIG. 2, the mobile terminal 200 receives the SIB12 that contains the revision history of the notification information from among the notification information transmitted from the base station 100. Then, on the basis of the change information contained in the revision history in the SIB12, the mobile terminal 200 updates the notification information that is retained in the mobile terminal 200. For example, as in the example described above, if the "paging period of "8"" is contained in the SIB12, the mobile terminal 200 updates the paging period retained in the mobile terminal 200 to "8".

As described above, if notification information has been changed, the base station 100 transmits an SIB containing revision history of the notification information. Then, if the mobile terminal 200 detects that the notification information has been changed, the mobile terminal 200 updates the notification information by receiving, from among notification information transmitted from the base station 100, the SIB containing the revision history of the notification information. Accordingly, because the mobile terminal 200 receives only an SIB that contains revision history even when the notification information has been changed, the mobile terminal 200 can reduce electrical power consumed when the receiving process is performed on the notification information and also reduce electrical power consumed when the update process is performed on the notification information.

In the following, similarly to the example illustrated in FIG. 2, the base station 100 in the example illustrated in FIG. 3 regularly transmits the SIB1 to the SIB12. In this example, which is similar to the example illustrated in FIG. 2, it is assumed that the information contained in the SIB2 has been changed. Furthermore, it is assumed that a cell ID and a "Value tag" are contained in the SIB1.

It is assumed that the mobile terminal 200 illustrated in FIG. 3 moves from a cell formed by the base station 100 to another cell and then again moves into the cell formed by the base station 100. Furthermore, it is assumed that, even after the mobile terminal 200 has moved to the other cell, the mobile terminal 200 still retains the notification information that is received from the base station 100 when the mobile terminal 200 is located in the cell formed by the base station 100.

In such a case, from among the notification information transmitted from the base station 100, the mobile terminal 200 receives the SIB1 that contains a "Value tag". Then, from among the notification information retained in the mobile terminal 200, the mobile terminal 200 determines whether notification information containing a cell ID that matches the cell ID contained in the SIB1 is present. If the notification information containing the cell ID that matches the cell ID contained in the SIB1 is present, the mobile terminal 200 determines whether the "Value tag" of the notification information matches the "Value tag" contained in the SIB1.

In this example, it is assumed that the mobile terminal 200 retains notification information, which contains a cell ID that matches the cell ID contained in the SIB1 but contains a "Value tag" that does not match the "Value tag" contained in the SIB1. In such a case, as in the example illustrated FIG. 3, the mobile terminal 200 receives the SIB12 containing the revision history of the notification information. Then, on the basis of the change information contained in the revision history in the SIB12, the mobile terminal 200 updates the notification information that is retained in the mobile terminal 200.

As described above, when the mobile terminal 200 moves between cells, first, the mobile terminal 200 receives an SIB that contains a "Value tag" from among the notification information transmitted from the base station 100 and then determines whether the "Value tag" matches that in the notification information retained in the mobile terminal 200. Then, if the mobile terminal 200 retains the notification information that contains a matched cell ID but contains a "Value tag" that does not match, the mobile terminal 200 updates the notification information by receiving the SIB containing the revision history of the notification information. Accordingly, because the mobile terminal 200 receives only an SIB that contains the revision history even when the mobile terminal 200 moves between cells, the mobile terminal 200 can reduce electrical power consumed when the receiving process is performed on the notification information and also reduce electrical power consumed when the update process is performed on the notification information.

In the example illustrated in FIGS. 2 and 3, a description has been given of an example in which the base station 100 transmits the SIB1 to the SIB11 and transmits the SIB12 containing the revision history of the notification information. However, the number of SIBs transmitted by the base station 100 is not limited to the example illustrated in FIGS. 2 and 3. For example, when the base station 100 transmits the SIB1 to an SIB15, the base station 100 may also transmit, in addition to the SIB1 to the SIB15, an SIB16 that contains the revision history of the notification information. In such a case, the mobile terminal 200 acquires the revision history of the notification information by receiving the SIB16.

Furthermore, in the example illustrated in FIGS. 2 and 3, a description has been given of an example in which revision history of notification information is contained in the single SIB12. However, the base station 100 may also transmit multiple SIBs containing the revision history of the notification information. For example, when the base station 100 transmits the SIB1 to the SIB15, in addition to the SIB1 to the SIB15, the base station 100 may also transmit the SIB16 and an SIB17 containing revision history of notification information. In such a case, the mobile terminal 200 acquires the revision history of the notification information by receiving the SIB16 and the SIB17.

Configuration of the Base Station According to the Second Embodiment

In the following, the configuration of the base station 100 according to the second embodiment will be described with reference to FIG. 4. FIG. 4 is a block diagram illustrating an configuration example of the base station 100 according to a second embodiment. Furthermore, FIG. 4 illustrates units related to the notification information transmission process performed by the base station 100.

As illustrated in FIG. 4, the base station 100 according to the second embodiment includes a paging creating unit 101, an encoding unit 102, a modulating unit 103, a notification information creating unit 104, a revision history creating unit 105, and a notification information buffer 106.

The paging creating unit 101 creates paging information to be transmitted to the mobile terminal 200. For example, the paging creating unit 101 creates paging information when it receives a call request from, for example, a higher-level device. Furthermore, for example, the paging creating unit 101 creates paging information when it receives a notification indicating that notification information has been changed from the notification information creating unit 104, which will be described later.

The encoding unit 102 encodes the paging information created by the paging creating unit 101. The modulating unit 103 modulates the paging information encoded by the encoding unit 102. Then, the modulating unit 103 outputs the modulated paging information to a radio transmitting unit 110. Accordingly, the paging information is transmitted to an external source via the radio transmitting unit 110 and an antenna 111.

The notification information creating unit 104 creates notification information. Specifically, if the notification information creating unit 104 receives a request to change the notification information from, for example, a higher-level device, the notification information creating unit 104 creates notification information on the basis of the change request. At this time, the notification information creating unit 104 increments the current "Value tag" and creates notification information containing the incremented "Value tag". Furthermore, the notification information creating unit 104 outputs the change information related to the notification information to the revision history creating unit 105. Accordingly, revision history of the notification information is created by the revision history creating unit 105. Then, the notification information creating unit 104 stores, in the notification information buffer 106, both the notification information created by the notification information creating unit 104 and the revision history of the notification information created by the revision history creating unit 105.

Furthermore, the notification information creating unit 104 notifies the paging creating unit 101 that the notification information has been changed. Accordingly, if the notification information has been changed, the paging creating unit 101 can create paging information and transmit the paging information to the cell formed by the base station 100.

The revision history creating unit 105 creates revision history of notification information on the basis of the change information related to the notification information that is received from the notification information creating unit 104. Then, the revision history creating unit 105 outputs the created revision history of the notification information to the notification information creating unit 104.

The notification information buffer 106 stores therein notification information. If the notification information stored in the notification information buffer 106 is changed, the notification information is updated by the notification information creating unit 104.

The notification information creating unit 104, the revision history creating unit 105, and the notification information buffer 106 will be described using the example illustrated in FIG. 2. The notification information buffer 106 stores therein the SIB1 to the SIB12 as notification information. If the notification information creating unit 104 receives, from a higher-level device, a request to change the information contained in the SIB2, the notification information creating unit 104 creates the SIB2 in accordance with the change request and outputs the change information related to the notification information to the revision history creating unit 105. On the basis of the change information related to the notification information received from the notification information creating unit 104, the revision history creating unit 105 creates the SIB12 containing the revision history of the notification information and outputs the created SIB12 to the notification information creating unit 104. Then, the notification information creating unit 104 updates the SIB2 and the SIB12 stored in the notification information buffer 106 to the SIB2 that is created by the notification information creating unit 104 and the SIB12 that is received from the revision history creating unit 105. If the notification information creating unit 104 changes the information contained in the SIB1 by incrementing the "Value tag", the notification information creating unit 104 updates the SIB1 stored in the notification information buffer 106 to the SIB1 in which the "Value tag" is incremented.

As illustrated in FIG. 4, the base station 100 includes a transmission timing control unit 107, an encoding unit 108, a modulating unit 109, the radio transmitting unit 110, and the antenna 111. The transmission timing control unit 107 controls the transmission timing of the notification information. For example, the transmission timing control unit 107 instructs the notification information buffer 106 to output notification information to the encoding unit 108 at 720-ms intervals.

The encoding unit 108 encodes the notification information that is output from the notification information buffer 106. The modulating unit 109 modulates the notification information that is encoded by the encoding unit 108. The radio transmitting unit 110 transmits the paging information that is input from the modulating unit 103 or the notification information that is input from the modulating unit 109 to an external source via the antenna 111.

In the following, the revision history of the notification information created by the revision history creating unit 105 illustrated in FIG. 4 will be described with reference to FIG. 5. FIG. 5 is a schematic diagram illustrating an example of the revision history of notification information created by the revision history creating unit 105 illustrated in FIG. 4.

In the example illustrated in FIG. 5, the revision history creating unit 105 creates the revision history of the notification information in the order of revision history R11, revision history R12 and revision history R13. Specifically, it is assumed that, first, the revision history creating unit 105 receives, from the notification information creating unit 104, the change information indicating that "received electrical power corresponding to the condition for moving into a cell ID of "XXX" is changed to "3 dB"". In such a case, the revision history creating unit 105 creates the revision history R11 as illustrated in FIG. 5.

Thereafter, for example, it is assumed that the revision history creating unit 105 receives, from the notification information creating unit 104, the change information indicating that "the cell ID of "YYY" is deleted from a peripheral cell list" and the change information indicating that "the cell ID of "ZZZ" is deleted from the peripheral cell list". In such a case, as in the example illustrated in FIG. 5, the revision history creating unit 105 creates the revision history R12 in which new change information is added to the revision history R11.

Thereafter, it is assumed that the revision history creating unit 105 receives, from the notification information creating unit 104, the change information indicating that "the paging period is changed to "8"". In such a case, as in the example illustrated in FIG. 5, the revision history creating unit 105 creates revision history R13 in which a new change is added to the revision history R12.

As described above, the revision history creating unit 105 creates revision history of the notification information every time the revision history creating unit 105 is notified by the notification information creating unit 104 of the change information related to the notification information. The revision history creating unit 105 may also regularly delete the change information contained in the revision history of the notification information. For example, the revision history creating unit 105 may also delete change information when a predetermined time has elapsed after a new change is added to the revision history of the notification information. Furthermore, for example, if the amount of information that can be set in an SIB is exceeded, the revision history creating unit 105 may also delete change information in its chronological order.

Configuration of the Mobile Terminal According to the Second Embodiment

In the following, the configuration of the mobile terminal 200 according to the second embodiment will be described with reference to FIG. 6. FIG. 6 is a block diagram illustrating an example configuration of the mobile terminal 200 according to the second embodiment. Furthermore, FIG. 6 illustrates units related to the notification information receiving process performed by the mobile terminal 200.

As illustrated in FIG. 6, the mobile terminal 200 according to the second embodiment includes an antenna 201, a radio receiving unit 202, a demodulating unit 203, a decoding unit 204, a notification information buffer 205, a notification information processing unit 206, a paging processing unit 207, and a reception timing control unit 208.

The antenna 201 receives a signal from an external source. For example, the antenna 201 receives paging information and notification information from the base station 100. The radio receiving unit 202 receives various signals from an external source via the antenna 201. The process performed by the radio receiving unit 202 will be described later together with the process performed by the reception timing control unit 208.

The demodulating unit 203 demodulates the paging information and the notification information received by the radio receiving unit 202. The decoding unit 204 decodes the paging information or the notification information demodulated by the demodulating unit 203. If the decoding unit 204 decodes the paging information, the decoding unit 204 outputs the decoded paging information to the paging processing unit 207. Furthermore, if the decoding unit 204 decodes the notification information, the decoding unit 204 outputs the decoded notification information to the notification information processing unit 206.

The notification information buffer 205 stores therein the notification information. Furthermore, the notification information buffer 205 stores therein multiple pieces of notification information. For example, it is assumed that the mobile terminal 200 moves from cell A to cell B. In such a case the notification information buffer 205 stores therein the notification information received from the base station in cell B that is the move destination and also stores therein the notification information received from the base station by the mobile terminal 200 in cell A.

The notification information processing unit 206 performs, for example, the update process on notification information by using notification information decoded by the decoding unit 204. Specifically, if an SIB containing revision history of notification information is input from the decoding unit 204, the notification information processing unit 206 stores, in the notification information buffer 205, the change information contained in the revision history of the notification information.

For example, in the example illustrated in FIG. 2, the notification information processing unit 206 receives an input of the SIB12 from the decoding unit 204. In such a case, the notification information processing unit 206 stores, in the notification information buffer 205, the change information contained in the revision history in the SIB12.

Furthermore, if an SIB containing a cell ID or a "Value tag" is input from the decoding unit 204, the notification information processing unit 206 determines whether notification information containing a cell ID that matches that contained in the SIB is stored in the notification information buffer 205. If notification information containing a cell ID that matches that contained in the SIB is not stored in the notification information buffer 205, the notification information processing unit 206 instructs the reception timing control unit 208 to receive all of the SIBs.

Furthermore, if notification information containing a cell ID that matches that contained in the SIB is stored, the notification information processing unit 206 determines whether notification information containing the cell ID and the "Value tag" that match those contained in the SIB is stored in the notification information buffer 205. If both the "Value tags" match, the notification information processing unit 206 ends the process because it does not need to update the notification information stored in the notification information buffer 205. In contrast, if both the "Value tags" do not match, the notification information processing unit 206 instructs the reception timing control unit 208 to receive the SIB containing the revision history of the notification information.

For example, in the example illustrated in FIG. 3, the notification information processing unit 206 receives an input of the SIB1 from the decoding unit 204. In such a case, the notification information processing unit 206 determines whether notification information containing a cell ID that matches the cell ID contained in the SIB1 is stored in the notification information buffer 205. If notification information containing a cell ID that matches that contained in the SIB1 is not stored in the notification information buffer 205, the notification information processing unit 206 instructs the reception timing control unit 208 to receive all of the SIB1 to the SIB12.

In contrast, if notification information containing a cell ID that matches that contained in the SIB1 is stored in the notification information buffer 205, the notification information processing unit 206 determines whether notification information containing a "Value tag" that matches that contained in the SIB1 is stored in the notification information buffer 205. If notification information containing a "Value tag" that matches that contained in the SIB1 is stored in the notification information buffer 205, the notification information processing unit 206 ends the process. In contrast, if notification information containing a "Value tag" that matches that contained in the SIB1 is not stored in the notification information buffer 205, the notification information processing unit 206 instructs the reception timing control unit 208 to receive the SIB12 containing the revision history of the notification information.

On the basis of the paging information decoded by the decoding unit 204, the paging processing unit 207 instructs the reception timing control unit 208 to receive notification information. Specifically, if the paging information is input from the decoding unit 204, the paging processing unit 207 determines whether the paging indicates a call. If the paging does not indicate a call, the paging processing unit 207 determines that notification information has been changed. Then, the paging processing unit 207 instructs the reception timing control unit 208 to receive an SIB containing the revision history of the notification information.

For example, in the example illustrated in FIG. 2, the base station 100 transmits, to the mobile terminal 200, the paging indicating that the notification information has been changed. In such a case, the paging processing unit 207 instructs the reception timing control unit 208 to receive the SIB12 containing the revision history of the notification information.

The reception timing control unit 208 controls, in accordance with an instruction from the notification information processing unit 206 or the paging processing unit 207, the timing of the reception performed by the radio receiving unit 202. Specifically, if the reception timing control unit 208 is instructed by the notification information processing unit 206 or the paging processing unit 207 to receive an SIB containing revision history of notification information, the reception timing control unit 208 controls the radio receiving unit 202 such that the radio receiving unit 202 receives the SIB. Furthermore, if the reception timing control unit 208 is instructed by the notification information processing unit 206 to receive all SIBs, the reception timing control unit 208 controls the radio receiving unit 202 such that the radio receiving unit 202 receives all of the SIB. Furthermore, if the mobile terminal 200 moves between cells, the reception timing control unit 208 controls the radio receiving unit 202 such that the radio receiving unit 202 receives an SIB containing a "Value tag".

Flow of the Notification Information Transmission Process Performed by the Base Station According to the Second Embodiment In the following, the flow of the notification information transmission process performed by the base station 100 according to the second embodiment will be described with reference to FIG. 7. FIG. 7 is a flowchart illustrating the flow of a notification information transmission process performed by the base station 100 according to the second embodiment.

As illustrated in FIG. 7, if the notification information creating unit 104 in the base station 100 receives a request to change notification information (Yes at Step S101), the notification information creating unit 104 creates an SIB that is the target for a change (Step S102). Then, the notification information creating unit 104 outputs change information related to the notification information to the revision history creating unit 105.

On the basis of the change information related to the notification information input from the notification information creating unit 104, the revision history creating unit 105 creates an SIB containing revision history of the notification information (Step S103). Then, the notification information creating unit 104 stores, in the notification information buffer 106, both the SIB created at Step S102 and the SIB created by the revision history creating unit 105.

Subsequently, when the notification information is to be transmitted (Yes at Step S104), the transmission timing control unit 107 instructs the notification information buffer 106 to output the notification information to the encoding unit 108. When receiving the instruction, the notification information buffer 106 outputs the notification information to the encoding unit 108. Accordingly, the base station 100 transmits, to the cell formed by the base station 100, the notification information stored in the notification information buffer 106 (Step S105).

If the notification information creating unit 104 changes notification information (Yes at Step S106), the notification information creating unit 104 instructs the paging creating unit 101 to transmit the paging. Consequently, the paging creating unit 101 creates paging information and transmits the paging via the encoding unit 102, the modulating unit 103, and the radio transmitting unit 110 (Step S107).

Then, the base station 100 returns to the process performed at Step S101. If the notification information has not been changed (No at Step S106), the base station 100 returns to the process performed at Step S101 without transmitting the paging.

Furthermore, even if the base station 100 does not receive a request to change the notification information (No at Step S101), when the notification information is to be transmitted (Yes at Step S104), the base station 100 transmits the notification information (Step S107).

Figure 8:
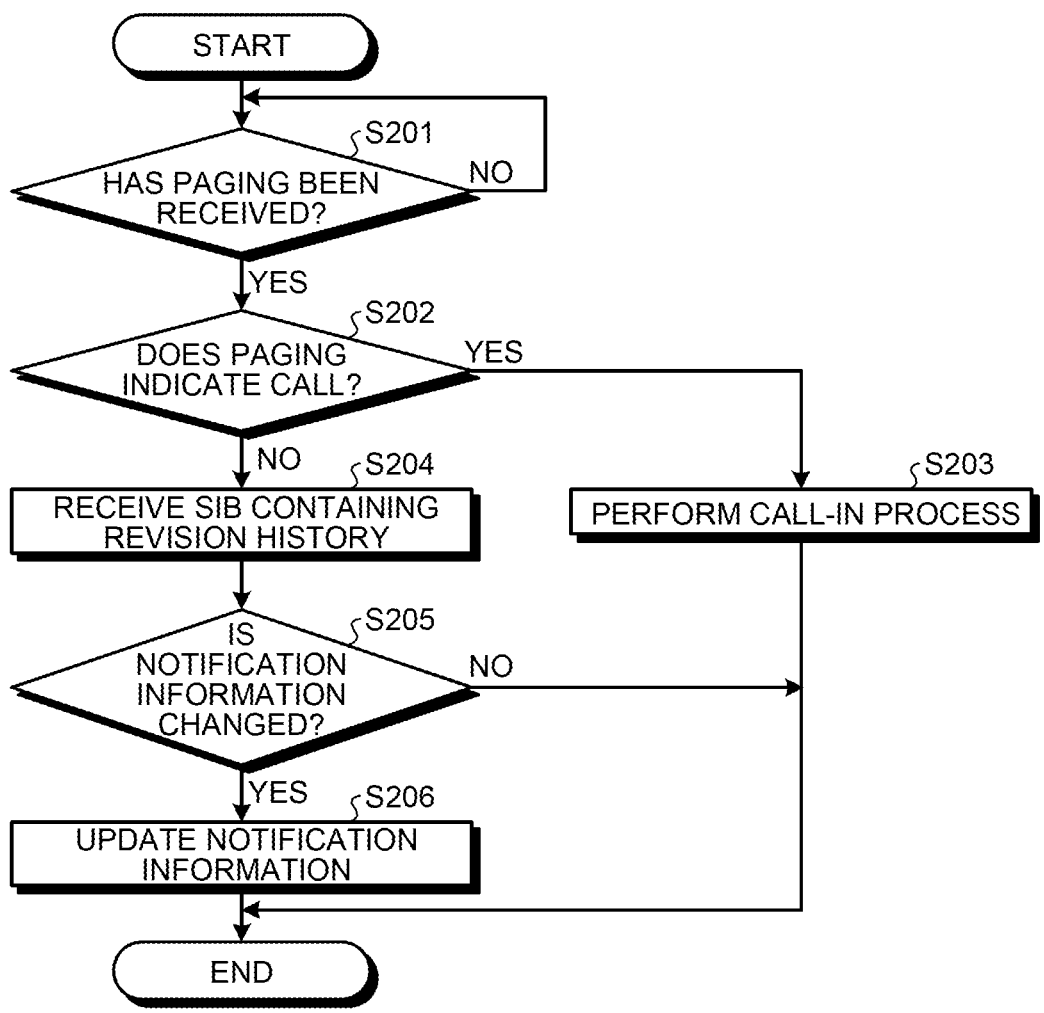
FIG. 8 is a flowchart illustrating the flow of a notification information receiving process performed by the mobile terminal according to the second embodiment.

Flow of the Notification Information Receiving Process Performed by the Mobile Terminal According to the Second Embodiment In the following, the flow of the notification information receiving process performed by the mobile terminal 200 according to the second embodiment will be described with reference to FIG. 8. FIG. 8 is a flowchart illustrating the flow of the notification information receiving process performed by the mobile terminal 200 according to the second embodiment. FIG. 8 illustrates the flow of the notification information receiving process performed by the mobile terminal 200 that is located to a cell.

As illustrated in FIG. 8, when the paging processing unit 207 in the mobile terminal 200 receives the paging from the base station 100 (Yes at Step S201), the paging processing unit 207 determines whether the paging indicates a call (Step S202). Then, if the paging processing unit 207 determines that the paging indicates a call (Yes at Step S202), the mobile terminal 200 controls a call (Step S203).

In contrast, if the paging does not indicate a call (No at Step S202), the paging processing unit 207 determines that notification information has been changed and instructs the reception timing control unit 208 to receive an SIB containing revision history of notification information. Accordingly, the radio receiving unit 202 receives the SIB containing the revision history of the notification information by being controlled by the reception timing control unit 208 (Step S204). The SIB is output to the notification information processing unit 206 via the demodulating unit 203 and the decoding unit 204.

Then, on the basis of the SIB containing the revision history of the notification information, the notification information processing unit 206 determines whether the notification information transmitted from the base station 100 has been updated (Step S205). If the change information contained in the SIB is not stored in the notification information buffer 205, the notification information processing unit 206 determines that the notification information has been changed (Yes at Step S205). Then, the notification information processing unit 206 updates the notification information stored in the notification information buffer 205 to the change information contained in the SIB (Step S206).

In contrast, if the change information contained in the SIB is stored in the notification information buffer 205, the notification information processing unit 206 determines that the notification information is not changed (No at Step S205) and ends the process.

Figure 9:
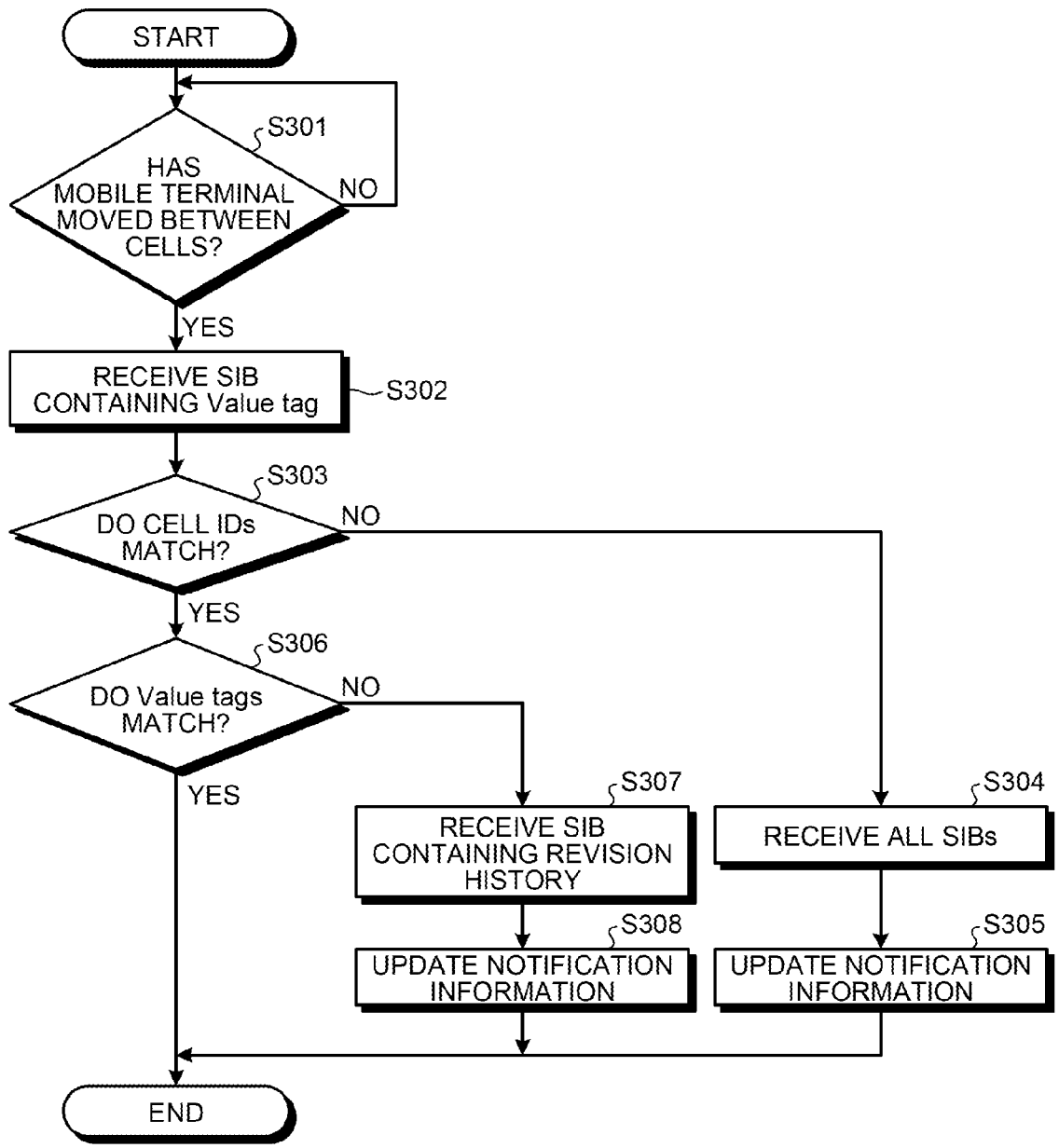
FIG. 9 is a flowchart illustrating the flow of a notification information receiving process performed when the mobile terminal according to the second embodiment moves between cells.

Flow of the Notification Information Receiving Process Performed when the Mobile Terminal According to the Second Embodiment Moves Between Cells In the following, the flow of the notification information receiving process performed when the mobile terminal 200 according to the second embodiment will be described with reference to FIG. 9. FIG. 9 is a flowchart illustrating the flow of a notification information receiving process performed when the mobile terminal 200 according to the second embodiment moves between cells. FIG. 9 illustrates the flow of the notification information receiving process performed by the mobile terminal 200 that moves between cells.

As illustrated in FIG. 9, when the mobile terminal 200 moves between cells (Yes at Step S301), the reception timing control unit 208 in the mobile terminal 200 controls the radio receiving unit 202 such that the SIB containing a "Value tag" is received.

Consequently, when the mobile terminal 200 moves between cells (Yes at Step S301), the radio receiving unit 202 receives the SIB containing the "Value tag" (Step S302). The SIB received by the radio receiving unit 202 is output to the notification information processing unit 206 via the demodulating unit 203 and the decoding unit 204.

If the notification information processing unit 206 receives an input of the SIB from the decoding unit 204, the notification information processing unit 206 determines whether notification information containing a cell ID that matches that contained in the SIB is stored in the notification information buffer 205 (Step S303).

If notification information containing a cell ID that matches that contained in the SIB is not stored in the notification information buffer 205 (No at Step S303), the notification information processing unit 206 instructs the reception timing control unit 208 to receive all of the SIBs. Accordingly, the radio receiving unit 202 receives all of the SIBs (Step S304). Then, on the basis of all of the SIBs received by the radio receiving unit 202, the notification information processing unit 206 updates the notification information stored in the notification information buffer 205 (Step S305).

In contrast, if notification information containing a cell ID that matches that contained in the SIB is stored in the notification information buffer 205 (Yes at Step S303), the notification information processing unit 206 determines whether the "Value tags" match (Step S306). Specifically, the notification information processing unit 206 determines whether the "Value tag" of the notification information that contains a cell ID that matches that contained in the SIB stored in the notification information buffer 205 matches the "Value tag" contained in the SIB.

If the both "Value tags" match (Yes at Step S306), the notification information processing unit 206 determines that the notification information stored in the notification information buffer 205 does not need to be updated and ends the process.

In contrast, if the both "Value tags" do not match (No at Step S306), the notification information processing unit 206 instructs the reception timing control unit 208 to receive the SIB containing the revision history of the notification information. Consequently, the radio receiving unit 202 receives the SIB containing the revision history of the notification information (Step S307). Then, on the basis of the revision history contained in the SIB received by the radio receiving unit 202, the notification information processing unit 206 updates the notification information stored in the notification information buffer 205 (Step S308).

Advantage of the Second Embodiment

As described above, in the wireless communication system 2 according to the second embodiment, the base station 100 transmits the notification information containing the revision history. If the notification information has been changed, the base station 100 notifies, by transmitting the paging, the mobile terminal 200 that the notification information has been changed. When the mobile terminal 200 receives the notification indicating that the notification information has been changed, the mobile terminal 200 receives the revision history of the notification information instead of receiving all the pieces of notification information and then updates the notification information retained in the mobile terminal 200 on the basis of the received revision history.

Furthermore, when the mobile terminal 200 according to the second embodiment moves between cells, the mobile terminal 200 receives the SIB containing the "Value tag" and determines, on the basis of both the cell ID and the "Value tag", whether the notification information transmitted from the base station 100 has been updated. If the notification information transmitted from the base station 100 has been updated, the mobile terminal 200 receives the revision history of the notification information instead of receiving all the pieces of the notification information and then updates the notification information retained in the mobile terminal 200 on the basis of the received revision history.

Accordingly, even if notification information has been changed or even if the mobile terminal 200 according to the second embodiment moves between cells, the mobile terminal 200 receives only revision history, thus reducing the electrical power consumed when the receiving process is performed on the notification information. Furthermore, the mobile terminal 200 updates the notification information by using the change information contained in the revision history of the notification information, thus reducing the electrical power consumed when the update process is performed on the notification information.

Third Embodiment

The wireless communication system or the like disclosed in the present application can be implemented as various kinds of embodiments other than the embodiments described above. Accordingly, in a third embodiment, another embodiment of the wireless communication system disclosed in the present application will be described.

Revision History of Notification Information (1)

In the second embodiment, as in the example illustrated in FIG. 5, a description has been given of an example in which the change information related to the notification information is created as the revision history. However, the base station 100 may also create revision history in which a "Value tag" of the notification information is associated with change information indicating that the notification information represented by the "Value tag" has been changed.

Figure 10:
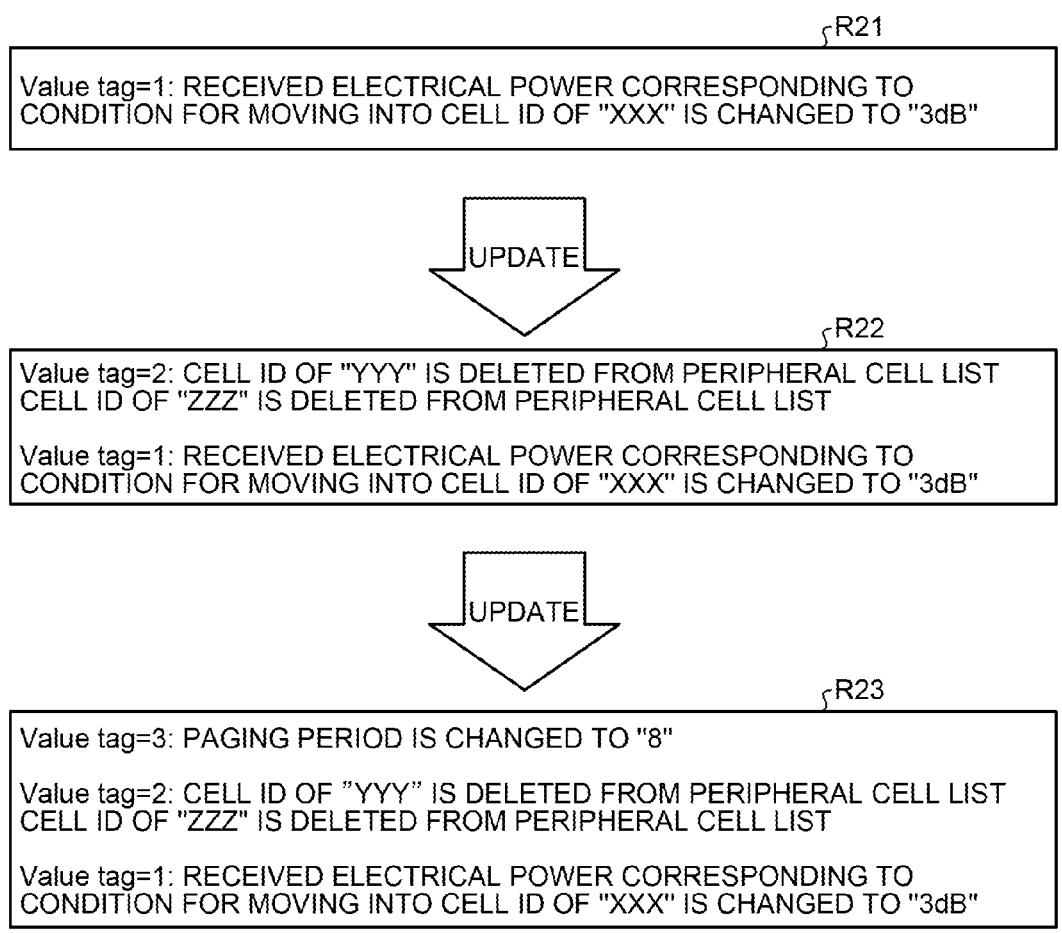
FIG. 10 is a schematic diagram illustrating an example of a revision history in which a "Value tag" is associated with change information.

FIG. 10 is a schematic diagram illustrating an example of a revision history in which a "Value tag" is associated with change information. In the example illustrated in FIG. 10, the revision history creating unit 105 in the base station 100 creates the revision history of the notification information in the order of the revision history R21, the revision history R22, and the revision history R23. Specifically, it is assumed that, first, the revision history creating unit 105 receives, from the notification information creating unit 104, the change information indicating that "received electrical power corresponding to the condition for moving into a cell ID of "XXX" is changed to "3 dB"". Furthermore, it is assumed that the revision history creating unit 105 receives, from the notification information creating unit 104, information indicating that the "Value tag" is "1". In such a case, as in the example illustrated in FIG. 10, the revision history creating unit 105 creates the revision history R21.

Thereafter, it is assumed that the revision history creating unit 105 receives, from the notification information creating unit 104, the change information indicating that "the cell ID of "YYY" is deleted from a peripheral cell list" and the change information indicating that "the cell ID of "ZZZ" is deleted from the peripheral cell list. Furthermore, it is assumed that the revision history creating unit 105 receives, from the notification information creating unit 104, information indicating that the "Value tag" is "2". In such a case, as in the example illustrated in FIG. 10, the revision history creating unit 105 creates the revision history R22. The notification information indicating that the "Value tag" is "1" is different from the notification information indicating that the "Value tag" is "2" in that the change information indicating that "the cell ID of "YYY" is deleted from a peripheral cell list" and "the cell ID of "ZZZ" is deleted from a peripheral cell list" are contained or not.

Thereafter, it is assumed that the revision history creating unit 105 receives, from the notification information creating unit 104, the change information indicating that "the paging period is changed to "8". Furthermore, it is assumed that the revision history creating unit 105 receives, from the notification information creating unit 104, information indicating that the "Value tag" is "3". In such a case, as in the example illustrated in FIG. 10, the revision history creating unit 105 creates the revision history R23. In other words, the notification information indicating that the "Value tag" is "2" is different from that indicating that the "Value tag" is "3" in that the change information indicating that "the paging period is changed to "8"" is contained or not.

If the notification information processing unit 206 according to the mobile terminal 200 receives the revision history of the notification information illustrated in FIG. 10, the notification information processing unit 206 acquires, from the revision history, the change information associated with the "Value tag" that is different from the "Value tag" stored in the notification information buffer 205. Then, on the basis of the acquired change information, the notification information processing unit 206 updates the notification information stored in the notification information buffer 205.

As described above, because the base station 100 transmits the revision history in which a "Value tag" is associated with the change information, the mobile terminal 200 can update only the change information that has not been reflected in the notification information buffer 205. Accordingly, the mobile terminal 200 can reduce electrical power consumed when the update process is performed on the notification information.

Revision History of Notification Information (2)

In the second embodiment, as in the example illustrated in FIG. 5, a description has been given of a case in which change information related to the notification information is created as the revision history. However, the base station 100 may also create revision history in which the change date and time of notification information is associated with change information that has been changed at the change date and time.

FIG. 11 is a schematic diagram illustrating an example of a revision history in which the change date and time at which notification information is changed is associated with the change information. In the example illustrated in FIG. 11, the revision history creating unit 105 in the base station 100 creates the revision history of the notification information in the order of the revision history R31, the revision history R32, and the revision history R33. Specifically, it is assumed that, first, the revision history creating unit 105 receives, at "13:25:10" from the notification information creating unit 104, the change information indicating that "received electrical power corresponding to the condition for moving to a cell ID of "XXX" is changed to "3 dB"". In such a case, as in the example illustrated in FIG. 11, the revision history creating unit 105 creates the revision history R31.

Thereafter, if the revision history creating unit 105 receives, at "13:40:25" from the notification information creating unit 104, the change information indicating that "the cell ID of "YYY" is deleted from the peripheral cell list" and the change information indicating that "the cell ID of "ZZZ" is deleted from the peripheral cell list". In such a case, as in the example illustrated in FIG. 11, the revision history creating unit 105 creates the revision history R32. Thereafter, it is assumed that the revision history creating unit 105 receives, at "13:52:05" from the notification information creating unit 104, the change information indicating that "the paging period is changed to "8". In such a case, as in the example illustrated in FIG. 11, the revision history creating unit 105 creates the revision history R33.

If the notification information processing unit 206 in the mobile terminal 200 receives the revision history of the notification information illustrated in FIG. 11, the notification information processing unit 206 acquires, from the revision history, the change information that has been updated after the notification information stored in the notification information buffer 205 was updated. Then, the notification information processing unit 206 updates the notification information stored in the notification information buffer 205 on the basis of the acquired change information.

As described above, because the base station 100 transmits the revision history in which the change date and time is associated with the change information, the mobile terminal 200 can update only the change information that has not been reflected in the notification information buffer 205. Accordingly, the mobile terminal 200 can reduce electrical power consumed when the update process is performed on the notification information.

Furthermore, the base station 100 may also create revision history containing SIB number that identifies an SIB contained in the change information illustrated in FIGS. 10 and 11. For example, in the example illustrated in FIG. 10, it is assumed that the change information indicating that "received electrical power corresponding to the condition for moving to a cell ID of "XXX" is changed to "3 dB" is contained in the SIB3. In such a case, the base station 100 may also create revision history that contains, together with a "Value tag", the SIB number of "3" that is used to identify the SIB containing the change information. Furthermore, in this example, it is assumed that the SIB number of the SIB3 is "3".

Accordingly, when the mobile terminal 200 stores the notification information and the SIB in an associated manner in the notification information buffer 205, the mobile terminal 200 can update the change information on the basis of the SIB number contained in the revision history of the notification information.

Revision History of Notification Information (3)

In the second embodiment, as in the example illustrated in FIGS. 2 and 3, a description has been given of a case in which the SIB containing the revision history of the notification information is transmitted at the end of the notification information. However, the base station 100 may also transmit an SIB containing the notification information after an SIB containing a "Value tag". This case will be described with reference to FIG. 12.

FIG. 12 is a schematic diagram illustrating an example of a transmission/receiving process performed on notification information. In the example illustrated in FIG. 12, it is assumed that various kinds of information related to notification information is contained in the SIB1 to the SIB11 and assumed that the revision history of the notification information is contained in the SIB12. Furthermore, it is assumed that a "Value tag" is contained in the SIB1. In the example illustrated in FIG. 12, the base station 100 transmits the SIB1, the SIB12, and the SIB2 to the SIB11 in the order the SIBs are listed in this sentence.

In this example, it is assumed that the information contained in the SIB2 has been changed. Furthermore, it is assumed that, after the mobile terminal 200 moves from the cell formed by the base station 100 to another cell, the mobile terminal 200 again moves into the cell formed by the base station 100. In such a case, the mobile terminal 200 transmits the SIB1 containing the "Value tag" from among the notification information transmitted from the base station 100. If the "Value tag" of the notification information stored in the notification information buffer 205 is different from that contained in the SIB1, the mobile terminal 200 receives the SIB12 that contains the revision history of the notification information. Then, the mobile terminal 200 updates the notification information stored in the notification information buffer 205 on the basis of the revision history of the notification information contained in the SIB12.

As described above, because the base station 100 transmits the SIB12 after the SIB1, the mobile terminal 200 can continuously receive the SIB1 and the SIB12 when the mobile terminal 200 moves cells.

Revision History of Notification Information (4)

In the second embodiment described above, a description has been given of a case a new SIB containing revision history of notification information is created. However, the base station 100 may also create an SIB that contains both a "Value tag" and revision history of notification information. This example will be described with reference to FIG. 13.

FIG. 13 is a schematic diagram illustrating an example of a transmission/receiving process performed on notification information. In the example illustrated in FIG. 13, it is assumed that both a "Value tag" and revision history of notification information are contained in the SIB1. Furthermore, various kinds of information related to notification information is contained in the SIB2 to the SIB11.

In the example illustrated in FIG. 13, when the mobile terminal 200 moves cells, the mobile terminal 200 receives the SIB1 from among the notification information transmitted from the base station 100. Then, the mobile terminal 200 determines whether the "Value tag" of the notification information stored in the notification information buffer 205 is different from that contained in the SIB1. If both the "Value tags" differ, the mobile terminal 200 updates the notification information stored in the notification information buffer 205 on the basis of the revision history of the notification information contained in the SIB1.

As described above, because the base station 100 transmits the SIB containing both the "Value tag" and the revision history of the notification information, the mobile terminal 200 can update the notification information by only receiving the SIB when moving cells. Accordingly, in the example illustrated in FIG. 13, the mobile terminal 200 can reduce electrical power consumed when the update process is performed on the notification information.

Revision History of Notification Information (5)

In the second embodiment described above, a description has been given of a case in which the revision history containing the change information related to the notification information is created. However, the base station 100 may also create, as revision history, an SIB number for identifying the SIB that contains the changed notification information. This example will be described with reference to FIG. 14.

FIG. 14 is a schematic diagram illustrating an example of a transmission/receiving process performed on notification information. In the example illustrated in FIG. 14, it is assumed that the SIB1 to the SIB11 contain various kinds of information related to the notification information and assumed that the SIB12 contains an SIB number for identifying an SIB in which notification information has been changed. Furthermore, it is assumed that the information contained in the SIB2 has been changed. Specifically, it is assumed that the SIB number of "2" for identifying the SIB2 is contained in the SIB12.

In such a case, when the mobile terminal 200 receives paging from the base station 100, the mobile terminal 200 first receives the SIB12. Then, the mobile terminal 200 acquires the SIB number contained in the SIB12 and receives the SIB indicated by the SIB number. In the example illustrated in FIG. 14, because the SIB number of "2" is contained in the SIB12, the base station 100 receives the SIB12 after it receives the SIB2. Then, on the basis of the information contained in the SIB2, the base station 100 updates the notification information stored in the notification information buffer 205.

Program

The various processes performed in the embodiments described above can be implemented by programs prepared in advance and executed by a computer system such as a personal computer or a workstation. Accordingly, in the following, a computer that executes a transmission control program having the same function performed by the transmitter 10 illustrated in FIG. 1 will be described as an example with reference to FIG. 15. Furthermore, in the following, a computer that executes a reception control program having the same function performed by the receiving apparatus 20 illustrated in FIG. 1 will be described as an example with reference to FIG. 16.

Figure 15:
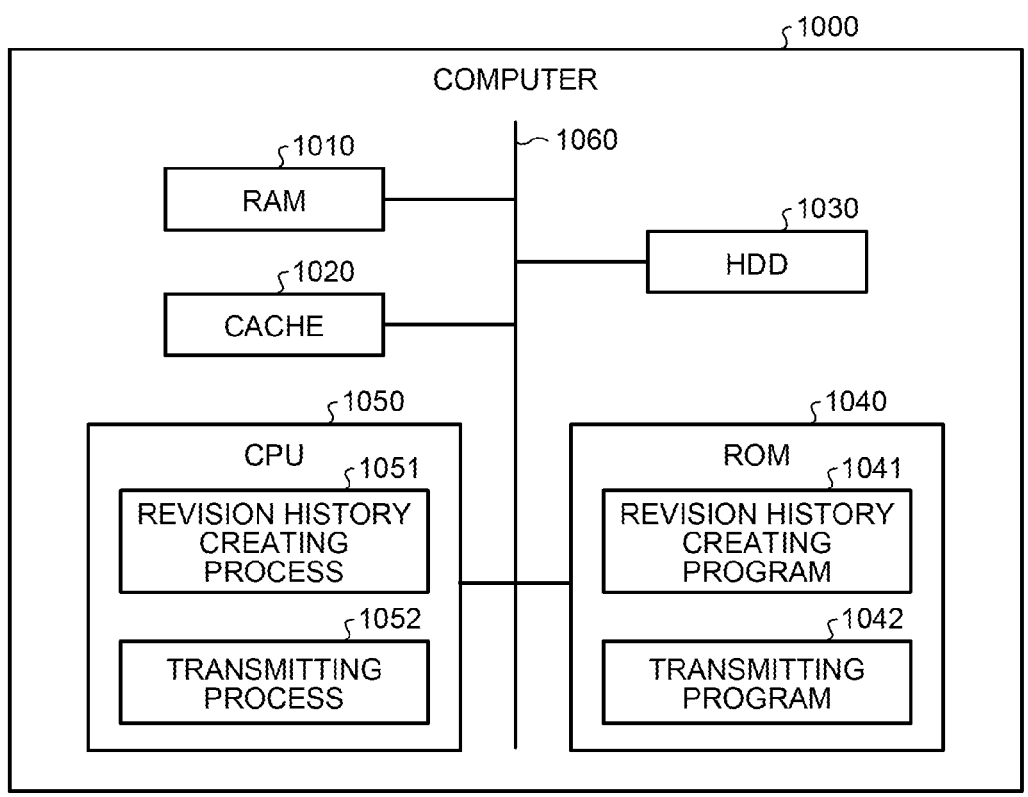
FIG. 15 is a block diagram illustrating a computer that executes a transmission control program.

FIG. 15 is a block diagram illustrating a computer that executes a transmission control program. As illustrated in FIG. 15, a computer 1000 includes a random access memory (RAM) 1010, a cache 1020, an HDD 1030, a read only memory (ROM) 1040, a central processing unit (CPU) 1050, and a bus 1060. The RAM 1010, the cache 1020, the HDD 1030, the ROM 1040, and the CPU 1050 are connected by the bus 1060.

The ROM 1040 stores therein, in advance, the transmission control program having the same function as that performed by the transmitter 10 illustrated in FIG. 1. Specifically, the ROM 1040 stores therein a revision history creating program 1041 and a transmitting program 1042. Then, the CPU 1050 reads, from the ROM 1040, the revision history creating program 1041 and the transmitting program 1042 and executes them.

By doing so, as illustrated in FIG. 15, the revision history creating program 1041 functions as a revision history creating process 1051. Furthermore, the transmitting program 1042 functions as a transmitting process 1052. The revision history creating process 1051 corresponds to the revision history creating unit 11 illustrated in FIG. 1. The transmitting process 1052 corresponds to the transmitting unit 12 illustrated in FIG. 1.

Figure 16:
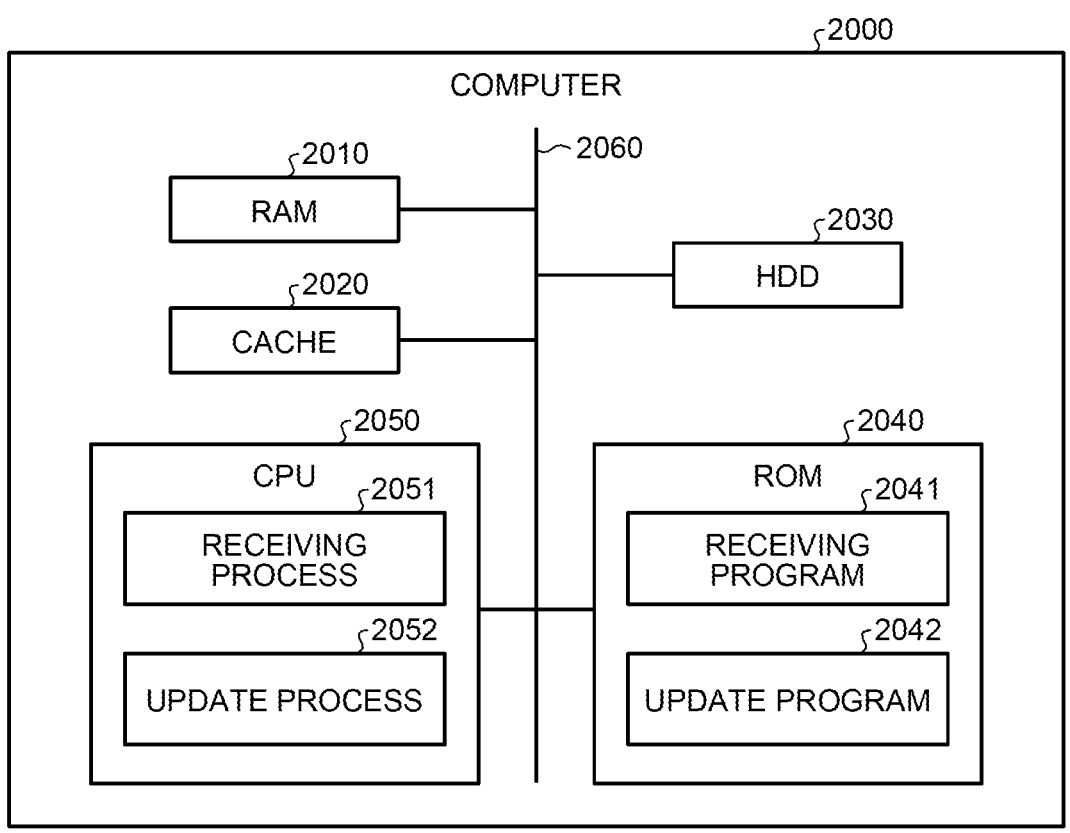
FIG. 16 is a block diagram illustrating a computer that executes a reception control program.

FIG. 16 illustrates a block diagram illustrating a computer that executes the reception control program. As illustrated in FIG. 16, a computer 2000 includes a RAM 2010, a cache 2020, an HDD 2030, a ROM 2040, a CPU 2050, and a bus 2060. The RAM 2010, the cache 2020, the HDD 2030, the ROM 2040, and the CPU 2050 are connected by the bus 2060.

The ROM 2040 stores therein, in advance, the reception control program having the same function as that performed by the receiving apparatus 20 illustrated in FIG. 1. Specifically, the ROM 2040 stores therein a receiving program 2041 and an update program 2042. Then, the CPU 2050 reads, from the ROM 2040, the receiving program 2041 and the update program 2042 and executes them.

By doing so, as illustrated in FIG. 16, the receiving program 2041 functions as a receiving process 2051. Furthermore, the update program 2042 functions as an update process 2052. The receiving process 2051 corresponds to the receiving unit 22 illustrated in FIG. 1. The update process 2052 corresponds to the updating unit 23 illustrated in FIG. 1.

The above-described programs 1041, 1042, 2041, and 2042 are not always stored in the ROM 1040. For example, each of the programs may also be stored in a "portable physical medium", such as a flexible disk (FD), a CD-ROM, a DVD disk, a magneto-optic disk, an IC CARD, or the like, that can be inserted into the computer 1000 or 2000. Alternatively, each of the programs may also be stored in a "fixed physical medium", such as a hard disk drive (HDD), that can be arranged inside/outside the computer 1000 or 2000. Alternatively, each of the programs may also be stored in "another computer (or a server)" connected to the computer 1000 or 2000 via a public circuit, the Internet, a LAN, a WAN, or the like. Then, the computer 1000 or 2000 may also read and execute each of the programs from the flexible disk or the like described above.

System Configuration, Etc

The components of each unit illustrated in the drawings are only for conceptually illustrating the functions thereof and are not always physically configured as illustrated in the drawings. In other words, the specific shape of a separate or integrated device is not limited to the drawings. Specifically, all or part of the device can be configured by functionally or physically separating or integrating any of the units depending on various loads or use conditions. For example, the notification information creating unit 104 and the revision history creating unit 105 illustrated in FIG. 4 may also be integrated.

According to an aspect of an embodiment, an advantage is provided in that a wireless communication system can reduce electrical power consumed when a receiving process is performed on notification information.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A wireless communication system comprising a transmitter and a receiving apparatus, wherein the transmitter includes a revision history creating unit that creates a history block by adding a piece of change information indicating a current change in notification information to another piece of change information already contained in the history block and indicating a preceding change previous to the current change and containing change date and time of notification information associated with each piece of the change information related to notification information that has been changed at the change date and time, and a transmitting unit that transmits a plurality of blocks including a normal block containing a portion of the notification information and the history block created by the revision history creating unit, and the receiving apparatus includes a storing unit that stores therein notification information, a receiving unit that controls timing of reception to receive the history block and not to receive the normal block from among the plurality of blocks transmitted by the transmitting unit, and an updating unit that updates the notification information stored in the storing unit on the basis of a piece of the change information contained in the history block received by the receiving unit.

2. The wireless communication system according to claim 1, wherein
the transmitter further includes a notifying unit that notifies the receiving apparatus that notification information has been changed, and
when the receiving unit is notified by the notifying unit that the notification information has been changed, the receiving unit controls the timing of reception to receive only the history block from among the plurality of blocks transmitted by the transmitting unit.

3. The wireless communication system according to claim 1, wherein
the transmitting unit further transmits an identification block containing an identification number for identifying notification information, and
the receiving unit receives the identification block and controls the timing of reception, when the identification number contained in the identification block is different from an identification number of the notification information retained in the receiving apparatus, to receive only the history block from among the plurality of blocks transmitted by the transmitting unit.

4. The wireless communication system according to claim 1, wherein
the revision history creating unit creates the history block in which an identification number for identifying notification information is associated with each piece of the change information related to a change of the notification information indicated by the identification number, and
from among the pieces of change information contained in the history block received by the receiving unit, the updating unit updates the notification information stored in the storing unit on the basis of a piece of change information associated with an identification number that is different from the identification number of the notification information retained in the receiving apparatus.

5. The wireless communication system according to claim 1, wherein
the revision history creating unit creates the history block in which change date and time of notification information is associated with each piece of the change information related to notification information that has been changed at the change date and time, and
from among the change information contained in the history block received by the receiving unit, the updating unit updates the notification information stored in the storing unit on the basis of a piece of change information associated with change date and time that is different from change date and time of the notification information retained by the receiving apparatus.

6. The wireless communication system according to claim 3, wherein the transmitting unit transmits the identification block and the history block in the continuous time domain.

7. The wireless communication system according to claim 1, wherein
the revision history creating unit creates the history block which contains an identification number of notification information and revision history of notification information, and
when the identification number contained in the history block received by the receiving unit is different from the identification number of the notification information retained in the receiving apparatus, the updating unit updates the notification information stored in the storing unit on the basis of the revision history contained in the history block.

8. A transmitter comprising: a revision history creating unit that creates a history block by adding a piece of change information indicating a current change in notification information to another piece of change information already contained in the history block and indicating a preceding change previous to the current change and containing change date and time of notification information associated with each piece of the change information related to notification information that has been changed at the change date and time, and a transmitting unit that transmits a plurality of blocks including a normal block containing a portion of the notification information and the history block created by the revision history creating unit to a receiving apparatus.

9. A receiving apparatus comprising: a storing unit that stores therein notification information transmitted from a base station which transmits a plurality of blocks including a normal block containing a portion of the notification information and a history block by adding a piece of change information indicating a current change in notification information to another piece of change information already contained in the history block and indicating a preceding change previous to the current change and containing change date and time of notification information associated with each piece of the change information related to notification information that has been changed at the change date and time, a receiving unit that controls timing of reception to receive the history block and not to receive the normal block from among the plurality of blocks transmitted by the base station; and an updating unit that updates the notification information stored in the storing unit on the basis of a piece of the change information contained in history block received by the receiving unit.

10. A notification information transmission-reception method performed by a wireless communication system that includes a transmitter and a receiving apparatus, the notification information transmission-reception method comprising:
creating a history block by adding a piece of change information indicating a current change in notification information to another piece of change information already contained in the history block and indicating a preceding change previous to the current change and containing change date and time of notification information associated with each piece of the change information related to notification information that has been changed at the change date and time; transmitting, from the transmitter, a plurality of blocks including a normal block containing a portion of the notification information and the history block created at the creating; controlling, by the receiving apparatus, timing of reception to receive the history block and not to receive the normal block from among the plurality of blocks transmitted; and updating, on the basis of a piece of change information contained in the history block received at the receiving, notification information stored in a storing unit that stores therein the notification information.

11. A wireless communication system comprising a transmitter and a receiving apparatus, wherein
the transmitter includes
a revision history creating unit that creates a history block containing a plurality of pieces of change information corresponding to time-series changes in notification information and containing change date and time of notification information associated with each piece of the change information related to notification information that has been changed at the change date and time, and
a transmitting unit that transmits a plurality of blocks including a normal block containing a portion of the notification information and the history block created by the revision history creating unit, and
the receiving apparatus includes
a storing unit that stores therein notification information,
a receiving unit that controls timing of reception to receive the history block and not to receive the normal block from among the plurality of blocks transmitted by the transmitting unit, and
an updating unit that updates the notification information stored in the storing unit on the basis of a piece of change information in the history block received by the receiving unit, the piece of change information associated with change date and time that is different from change date and time of the notification information retained by the receiving apparatus.

* * * * *